(12) United States Patent
Sills et al.

(10) Patent No.: US 7,451,658 B2
(45) Date of Patent: Nov. 18, 2008

(54) SENSING APPARATUS AND METHOD

(75) Inventors: Colin Stuart Sills, Cambridge (GB); Darran Kreit, Foxton (GB); Mark Anthony Howard, Worlington (GB)

(73) Assignee: Sensopad Limited (GB)

( * ) Notice: Subject to any disclaimer, the term of this patent is extended or adjusted under 35 U.S.C. 154(b) by 114 days.

(21) Appl. No.: 10/541,736

(22) PCT Filed: Dec. 31, 2003

(86) PCT No.: PCT/GB03/05701

§ 371 (c)(1),
(2), (4) Date: Mar. 10, 2006

(87) PCT Pub. No.: WO2004/061759

PCT Pub. Date: Jul. 22, 2004

(65) Prior Publication Data

US 2006/0232269 A1 Oct. 19, 2006

(30) Foreign Application Priority Data

Jan. 7, 2003 (GB) ................................. 0300291.2
Aug. 1, 2003 (GB) ................................. 0318121.1

(51) Int. Cl.
*G01B 7/16* (2006.01)
(52) U.S. Cl. ....................................................... 73/779
(58) Field of Classification Search .................... 73/779
See application file for complete search history.

(56) References Cited

U.S. PATENT DOCUMENTS

| | | | | |
|---|---|---|---|---|
| 4,047,814 A | * | 9/1977 | Westcott | ...................... 356/38 |
| 4,566,001 A | | 1/1986 | Moore et al. | |
| 4,936,148 A | * | 6/1990 | Shaw et al. | ..................... 73/728 |
| 4,964,306 A | * | 10/1990 | Jacobsen et al. | .............. 73/763 |
| 5,325,869 A | * | 7/1994 | Stokes | ......................... 600/592 |
| 5,400,661 A | * | 3/1995 | Cook et al. | ............. 73/862.043 |
| 5,815,091 A | | 9/1998 | Dames et al. | |
| 6,272,371 B1 | * | 8/2001 | Shlomo | ....................... 600/424 |
| 6,447,449 B1 | * | 9/2002 | Fleischman et al. | .......... 600/405 |
| 6,484,586 B1 | * | 11/2002 | Dutoit et al. | ................... 73/722 |
| 6,486,665 B1 | * | 11/2002 | Funk et al. | .................... 324/260 |
| 6,557,414 B2 | * | 5/2003 | Sakurai et al. | ............ 73/504.04 |
| 6,579,612 B1 | * | 6/2003 | Lille | ............................ 428/332 |
| 6,770,988 B2 | * | 8/2004 | Denne | .......................... 310/12 |

(Continued)

FOREIGN PATENT DOCUMENTS

EP 0 650 139 4/1995

(Continued)

*Primary Examiner*—Max Noori
(74) *Attorney, Agent, or Firm*—Fogg & Powers LLC

(57) ABSTRACT

There is described a sensing apparatus comprising first and second members which are supported relative to each other by a support means. The first member comprises a magnetic field generator for generating a magnetic field and the second member comprises an aerial for monitoring the magnetic field generated by the magnetic field generator. At least one of the first and second members is locally deformable relative to the other of the first and second members in order to vary at least one of the magnetic field generated by the magnetic field generator and the electromagnetic coupling between the magnetic field generator and the receive aerial so that, in response to a local deformation, a signal is induced in the receive aerial indicative of the position of the local deformation.

29 Claims, 14 Drawing Sheets

U.S. PATENT DOCUMENTS

Figure 1A:
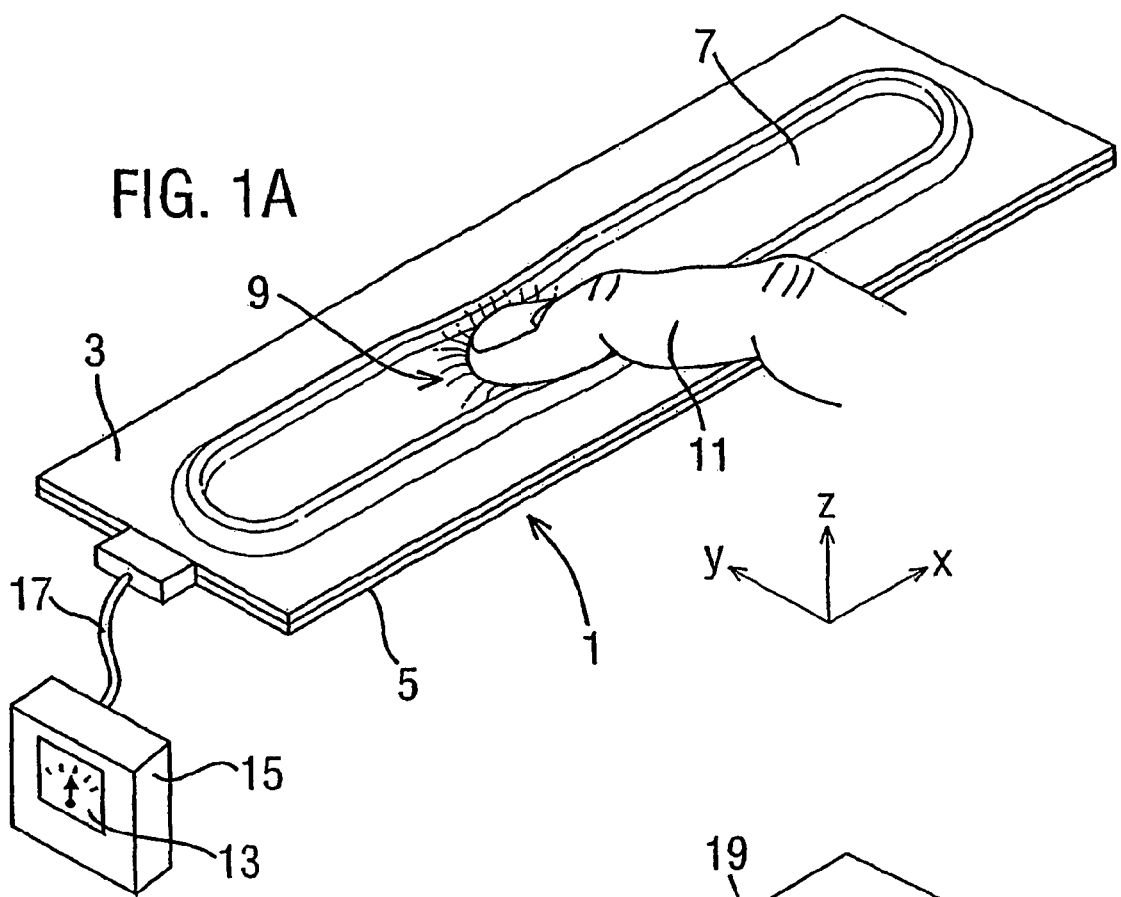

| | | | |
|---|---|---|---|
| 6,786,508 B2 * | 9/2004 | Fraley et al. | 380/751 |
| 7,233,241 B2 * | 6/2007 | Overhultz et al. | 340/539.2 |
| 2001/0001430 A1 | 5/2001 | Ely et al. | |
| 2004/0233178 A1 * | 11/2004 | Silk et al. | 345/179 |

FOREIGN PATENT DOCUMENTS

| | | |
|---|---|---|
| GB | 2 374 424 | 10/2002 |
| WO | WO 93/09529 | 5/1993 |

* cited by examiner

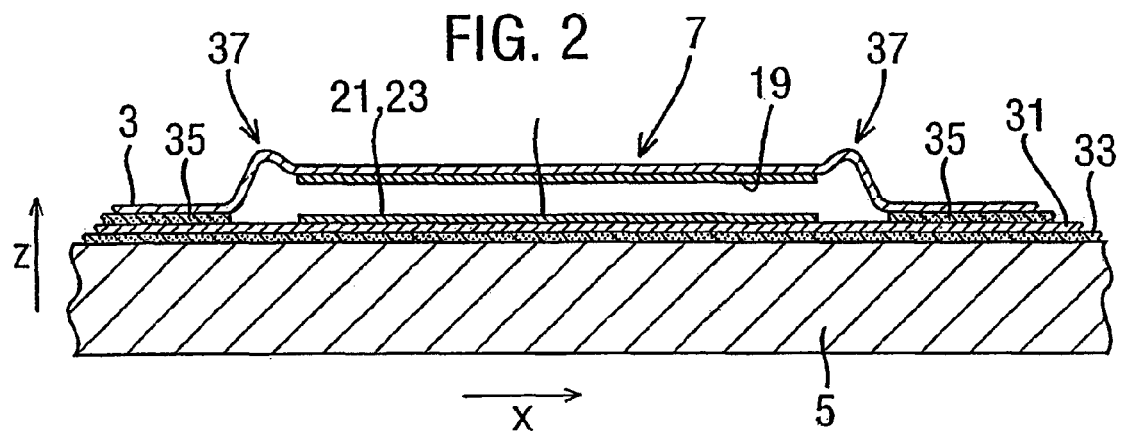
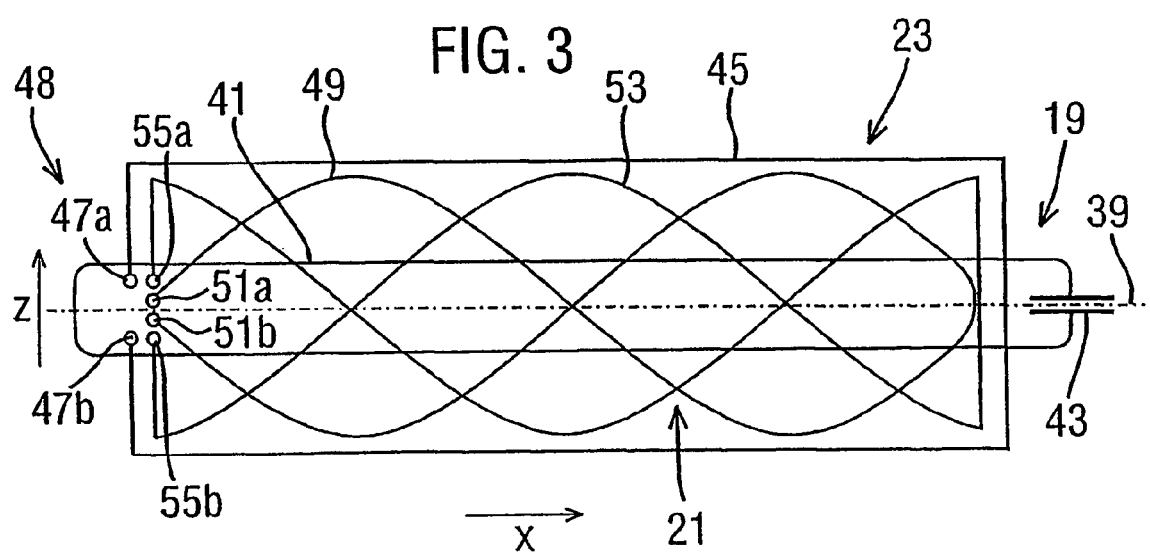

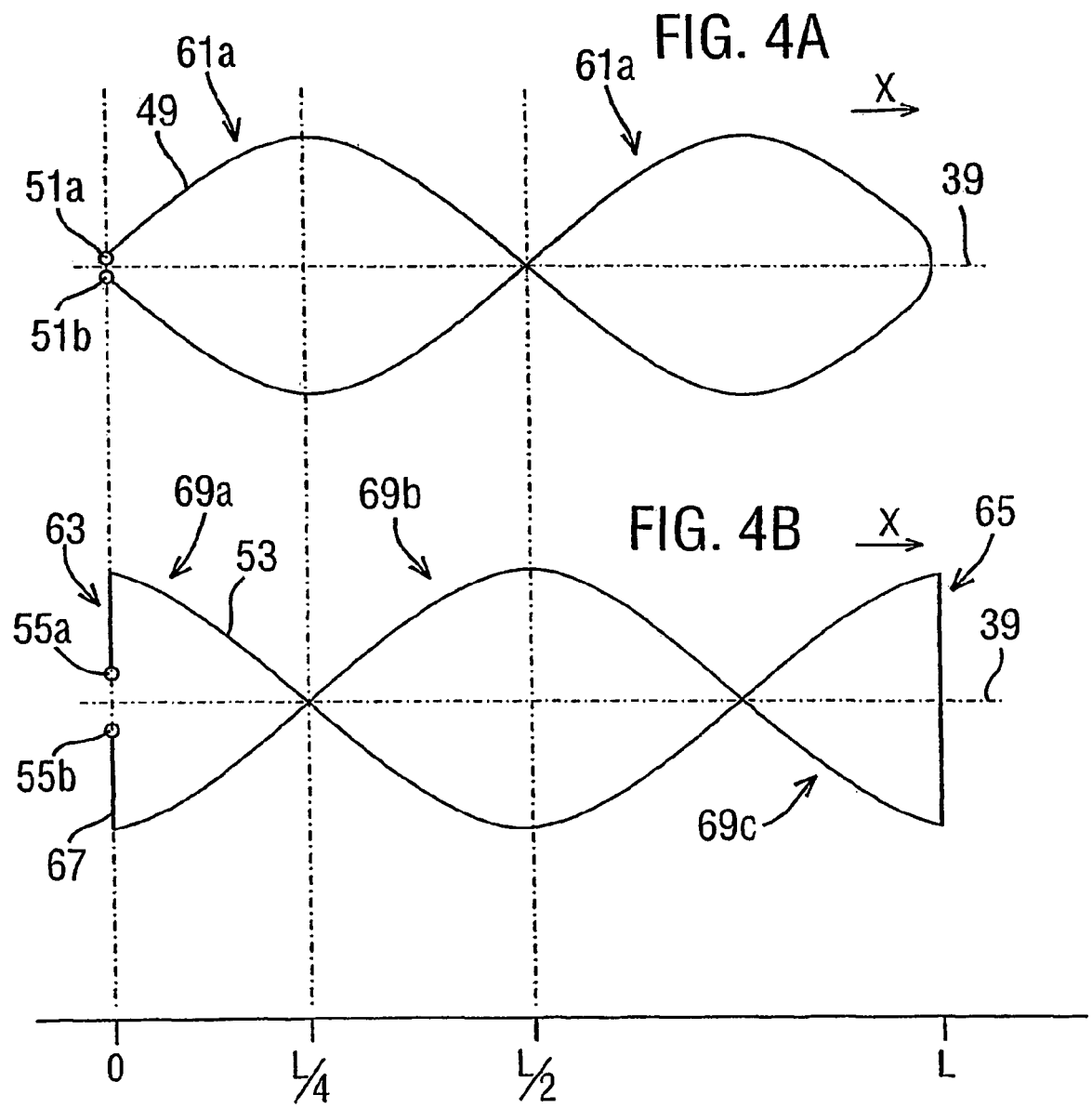

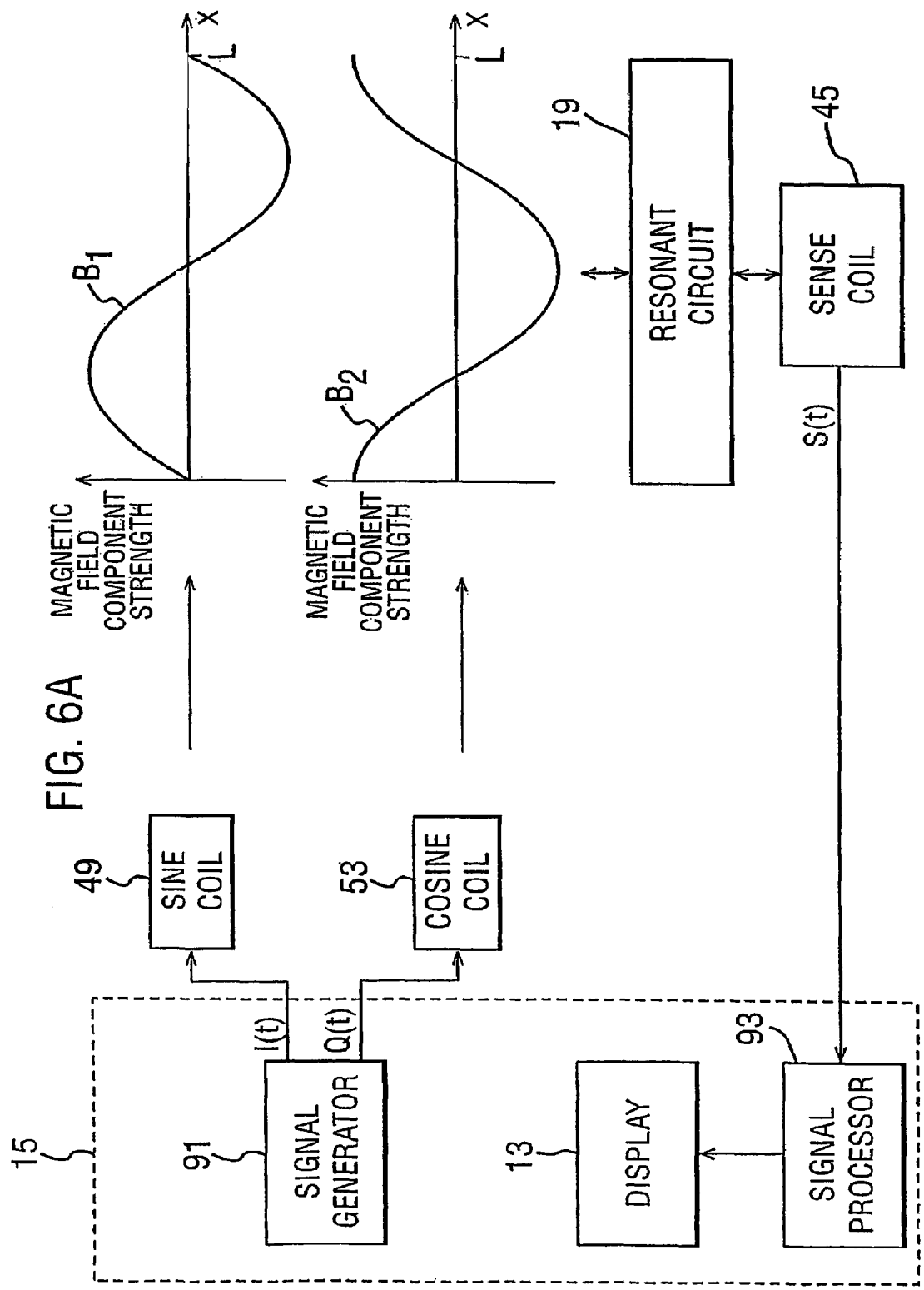

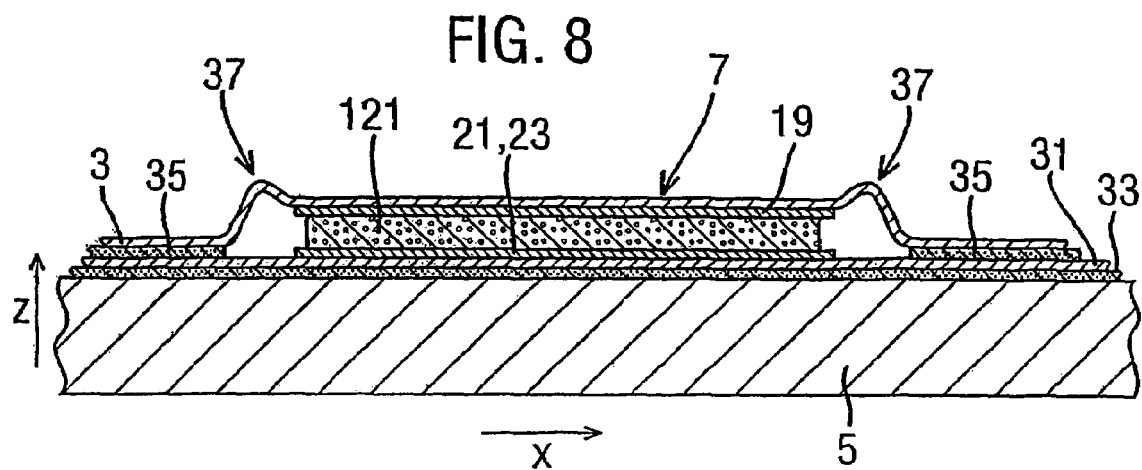
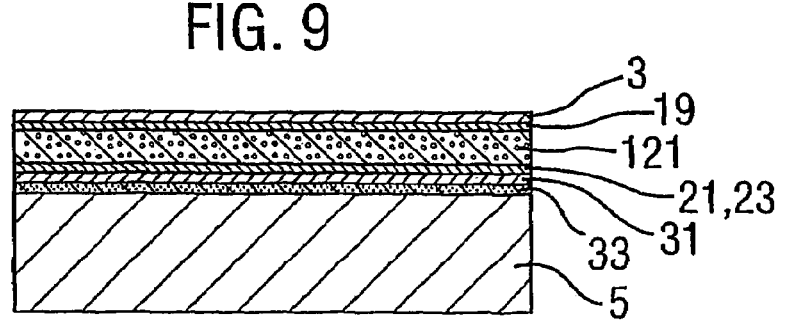

SENSING APPARATUS AND METHOD

This application claims priority to International Patent Application No. GB2003/005701 filed on Dec. 31, 2003, which claims priority to Patent Application No. 0300291.2 filed in Great Britain on Jan. 7, 2003 and Patent Application No. 0318121.1 filed in Great Britain on Aug. 1, 2003.

This invention relates to a method of sensing the position or the speed of an object, and an apparatus therefor. The invention has particular, but not exclusive, relevance to man-machine interfaces in which the sensed object position information corresponds to input data.

A wide variety of position sensors are available. For example, UK patent application GB 2374424A describes an inductive sensor in which a transmit aerial and a receive aerial are formed on a first member, and an intermediate coupling element is formed on a second member which is movable relative to the first member. When an excitation signal is applied to the transmit aerial, a signal is induced in the intermediate coupling element which depends upon the relative position of the first and second members, and the signal induced in the intermediate coupling element in turn induces a signal in the receive aerial which is processed to determine a value representative of the relative position of the first and second members.

The intermediate coupling element of the position sensor described in GB2374424A is a resonant circuit, and the excitation signal comprises an oscillating signal at the resonant frequency of the resonant circuit. In this way, the magnitude of the signal induced in the receive aerial is increased. In place of the resonant circuit, the intermediate coupling element could also be formed by a conductive loop or a conductive disk. Alternatively, instead of using an intermediate coupling element, the receive aerial could be incorporated with the second member so that applying an excitation signal to the transmit aerial directly induces a signal in the receive aerial.

While the inductive sensors described above are useful for many applications, they require relative movement between two members which each carry an electrical conductor of some form, and are therefore not suited to applications in which the position of a moving object which does not carry an electrical conductor is to be measured. For example, these inductive sensors are not well suited to measuring the position of a person's finger, which is often desirable for a man-machine interface.

According to an aspect of the invention, there is provided a sensing apparatus in which first and second members are supported relative to each other, with the distance between the first and second members being locally variable. The first member comprises a magnetic field generator for generating a magnetic field and the second member comprises an aerial for monitoring the magnetic field generated by the magnetic field generator. The sensing apparatus is arranged so that when the distance between the first and second members is locally varied, the magnetic field generator induces a signal in the aerial indicative of the position of the local variation.

Preferably the magnetic field generator is an intermediate coupling element and the second member includes a transmit aerial for inducing a signal in the intermediate coupling element in addition to the aerial for monitoring the magnetic field generated by the intermediate coupling element. In this way, no electrical connections need be made to the first member. In an embodiment, the support means supports the first member relative to the second member such that, in response to pressure applied to a localised region of one of the first and second members, the distance between the first and second members at the localised region reduces. This leads to a variation in the electromagnetic coupling between the first member and the second member resulting in a signal being induced in the aerial indicative of the position of the localised region.

Figure 1B:
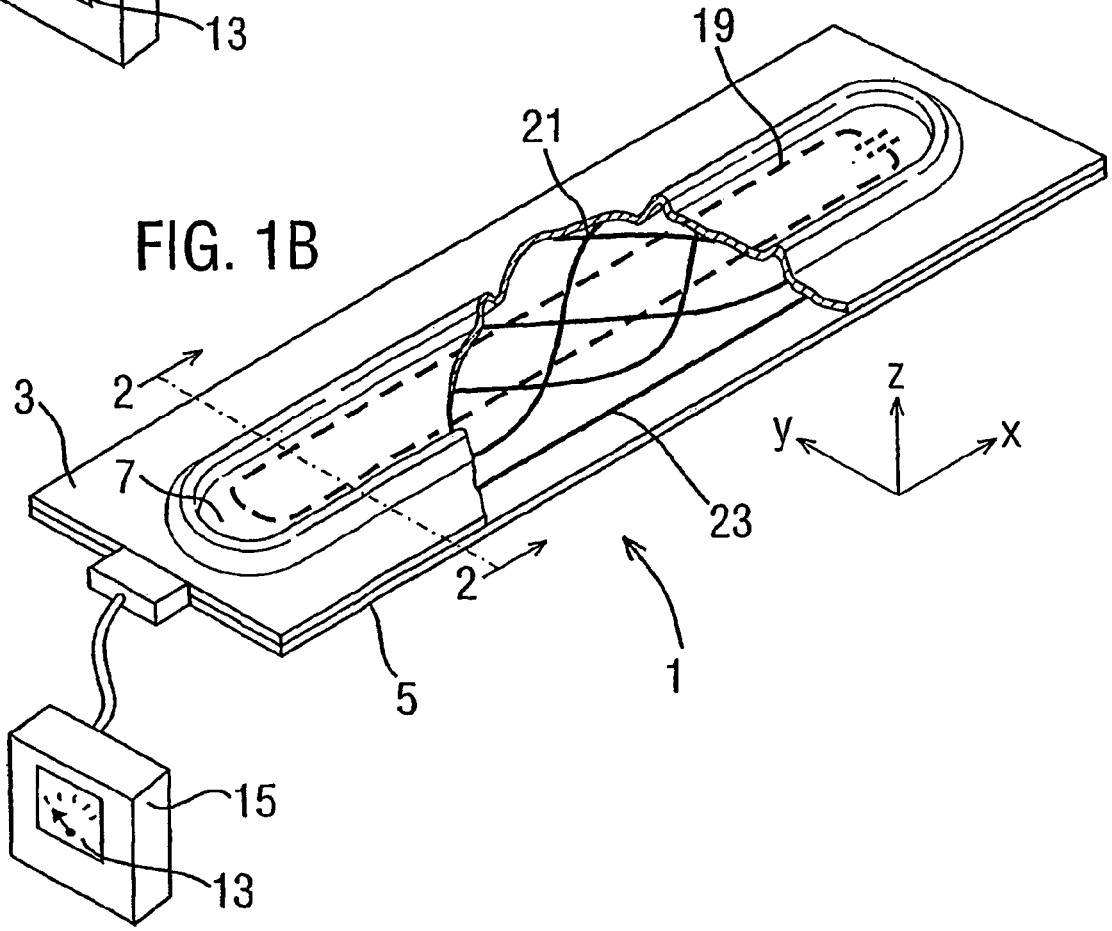
Figure 5A:
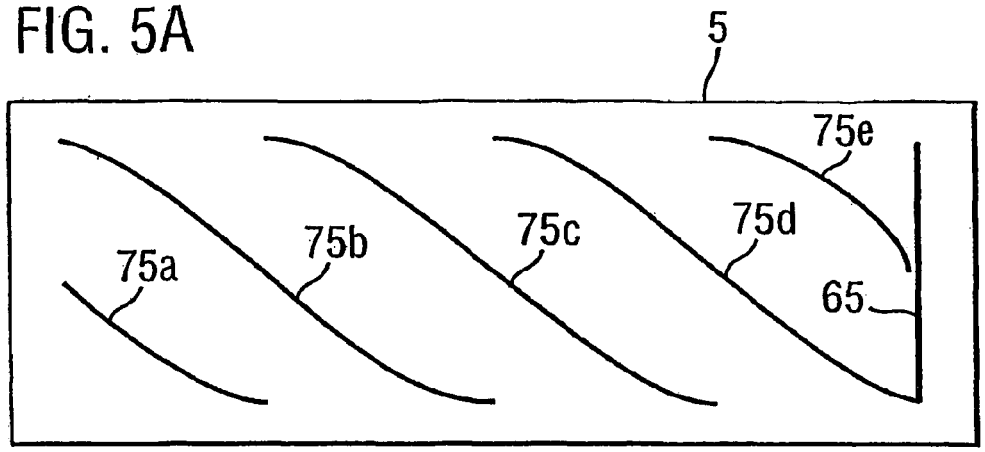
Figure 5B:
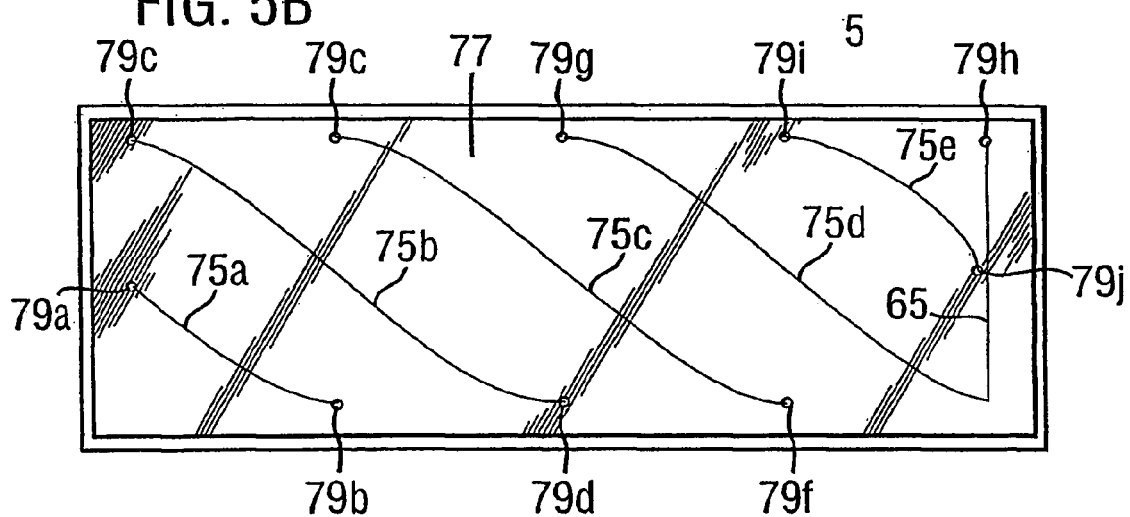
Figure 5C:
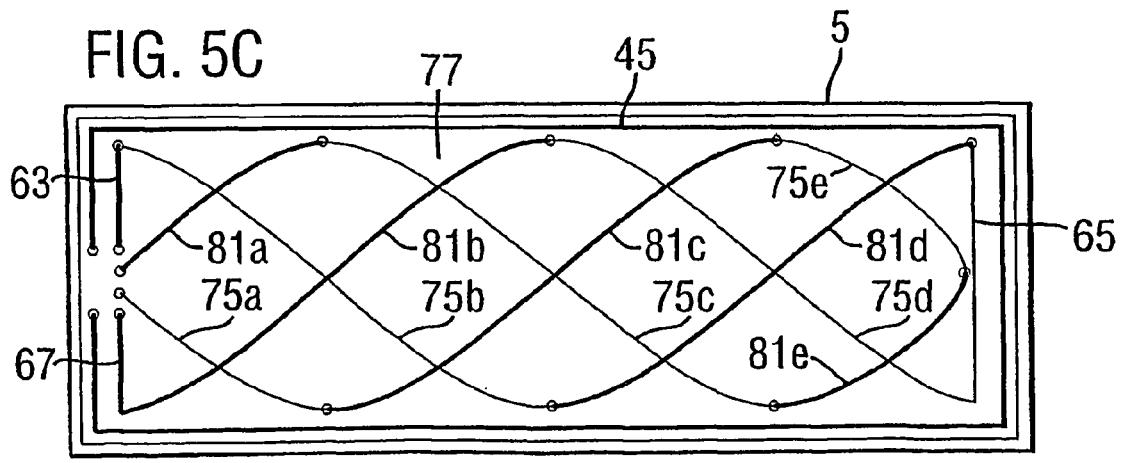
Figure 6B:
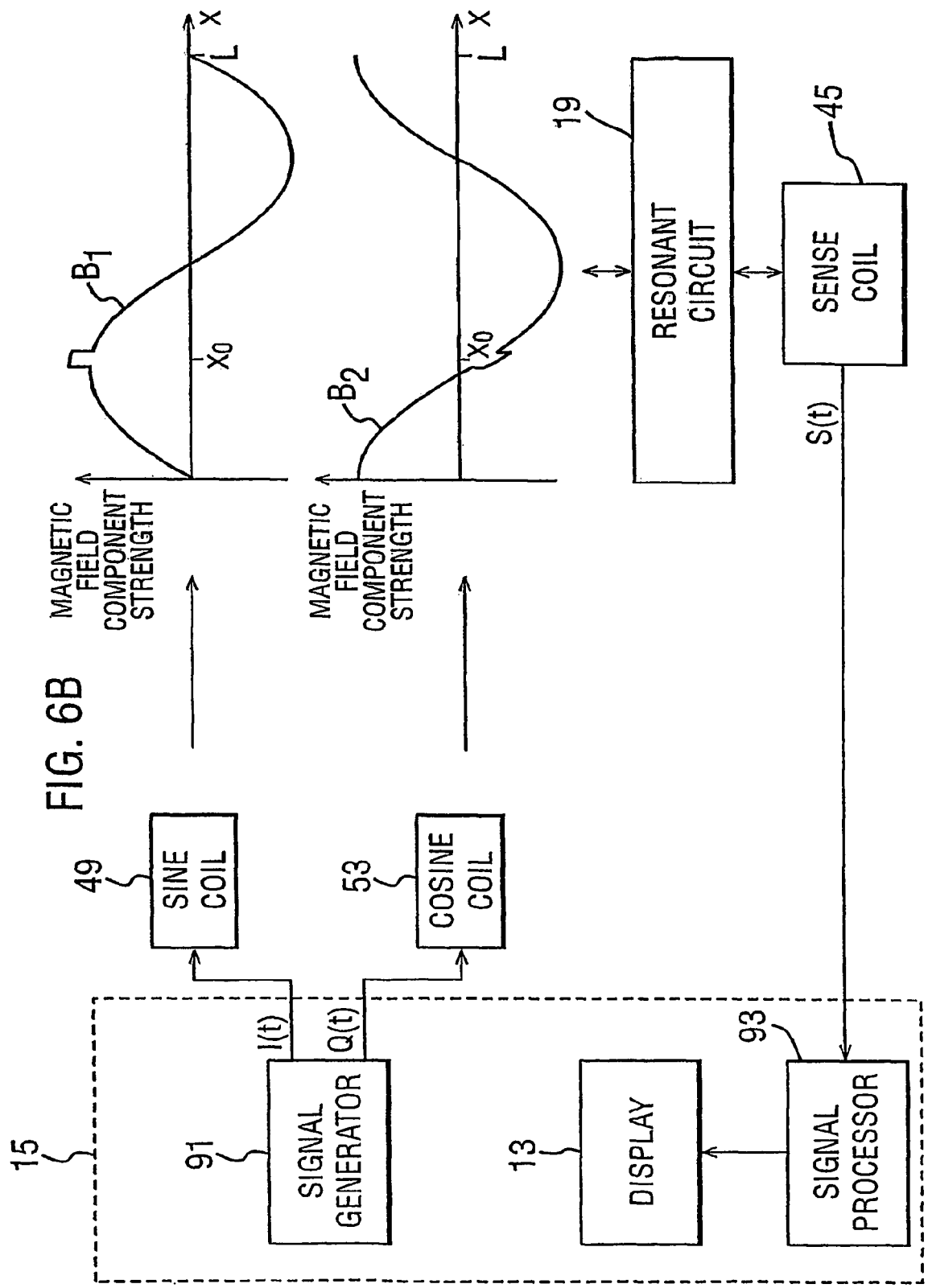
Figure 7:
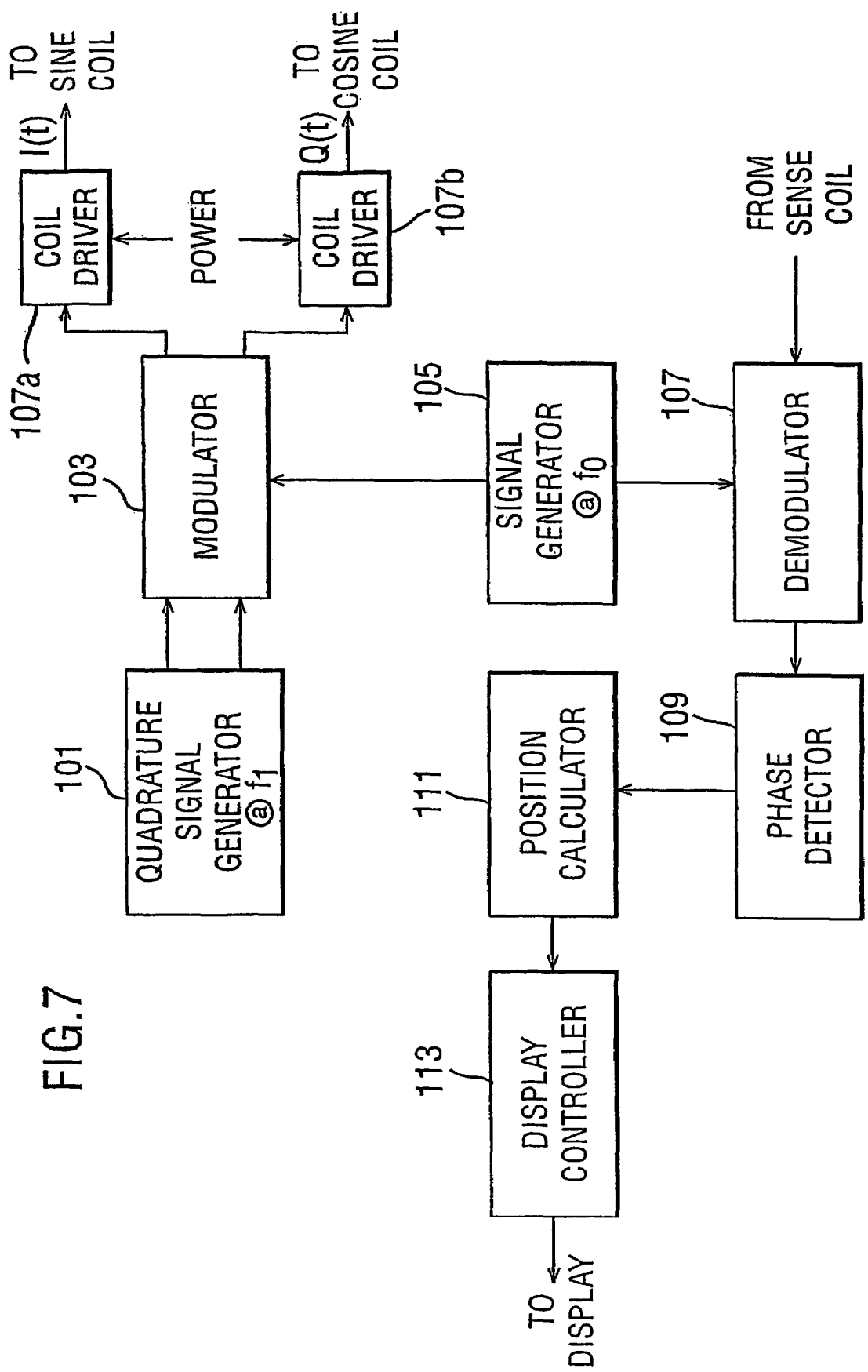
Figure 10:
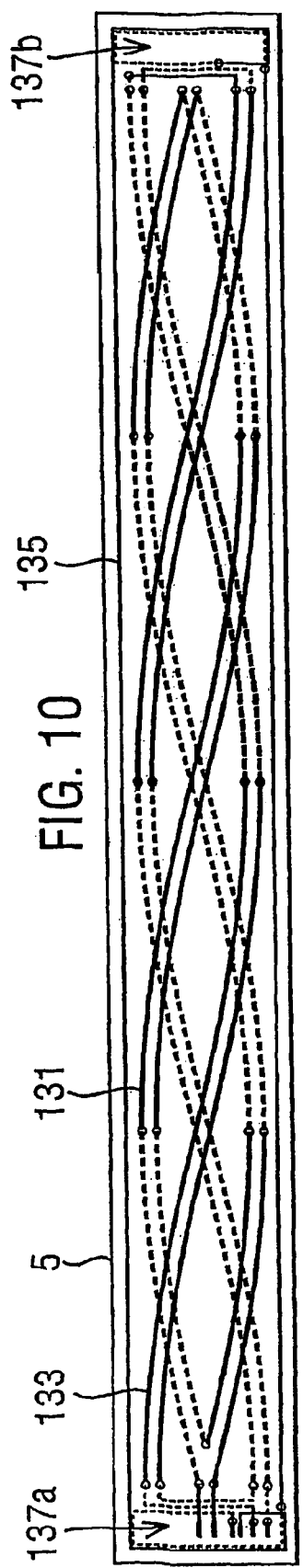
Figure 11:
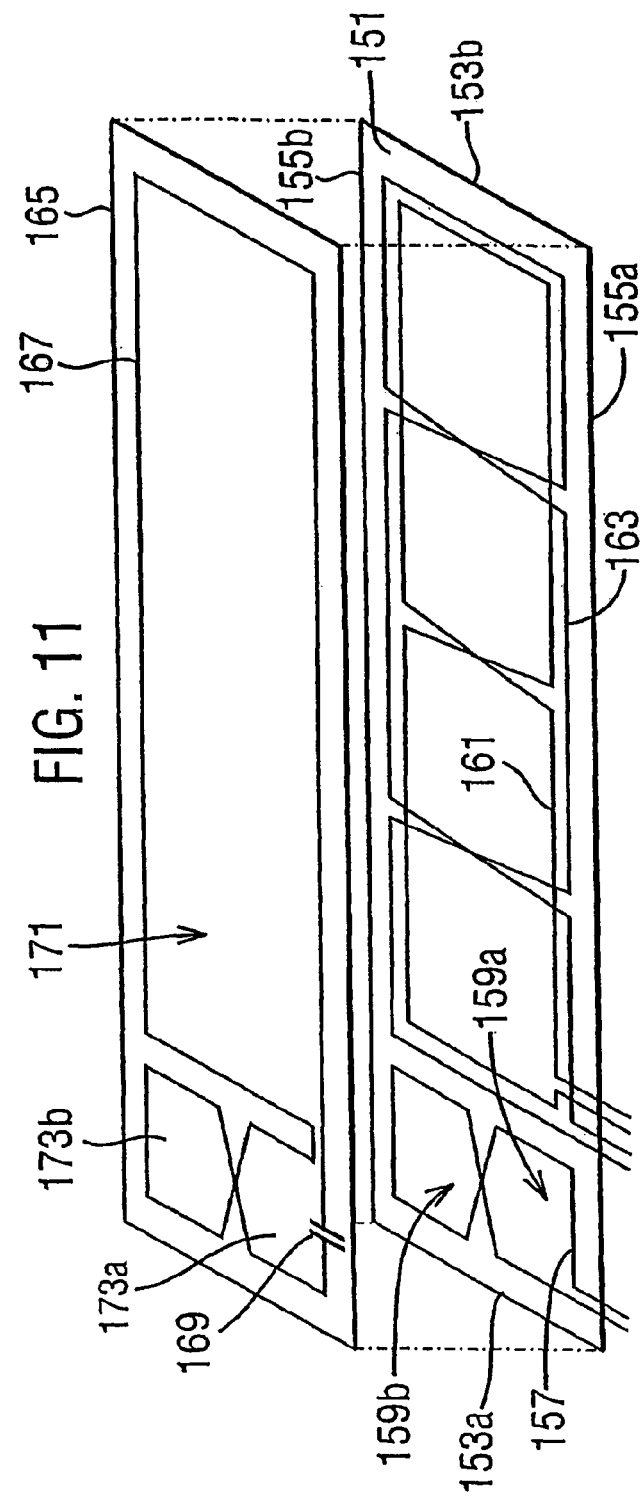
Figure 12:
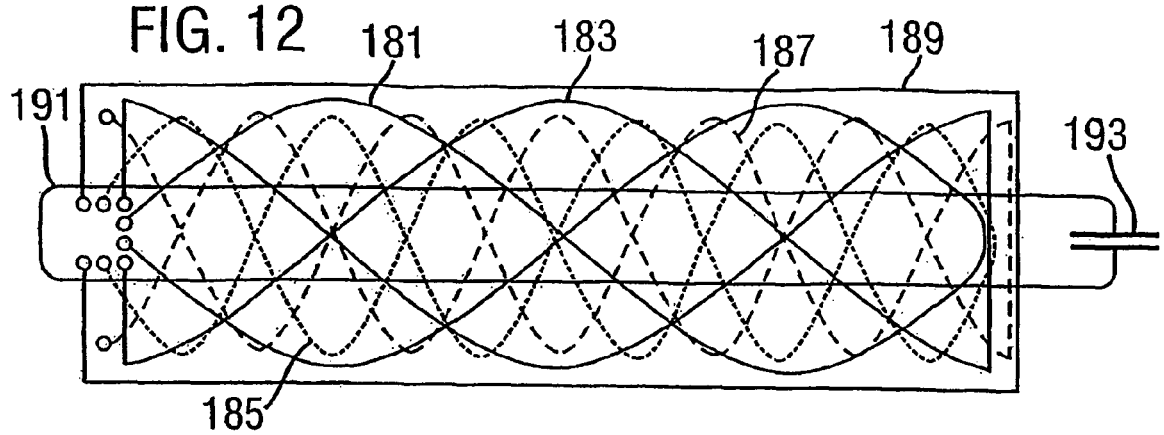
Figure 13:
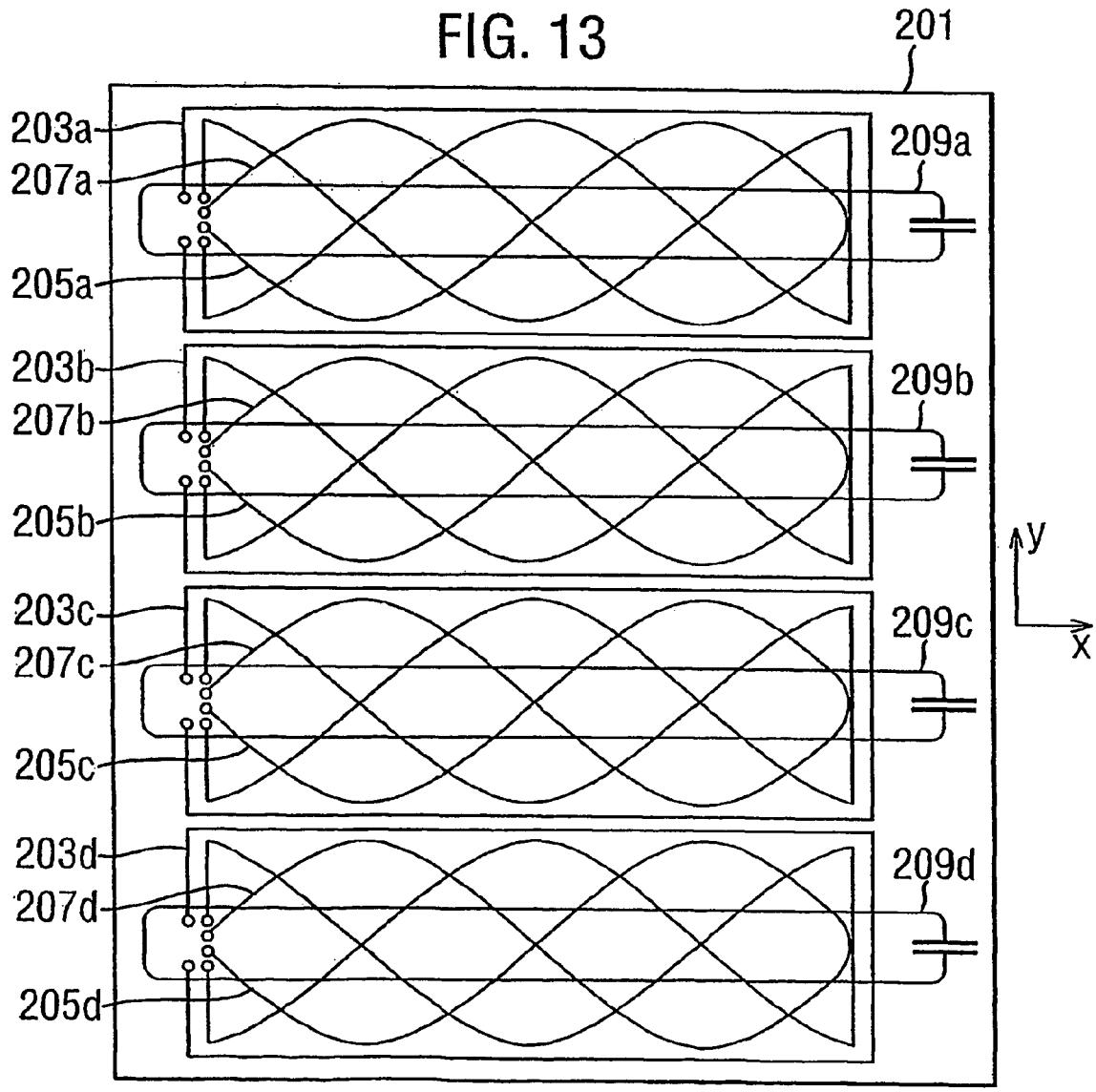
Figure 14:
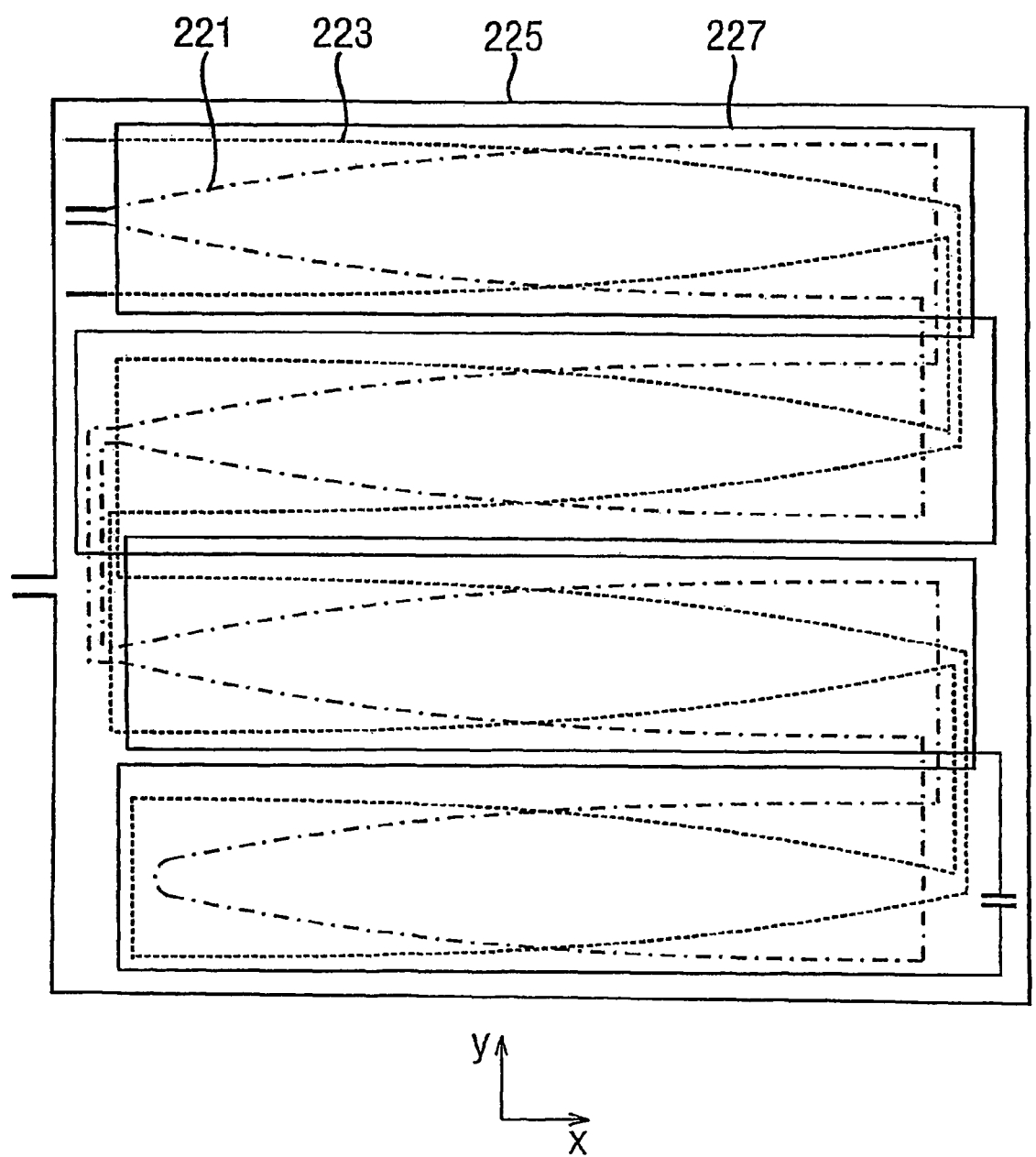
Figure 15:
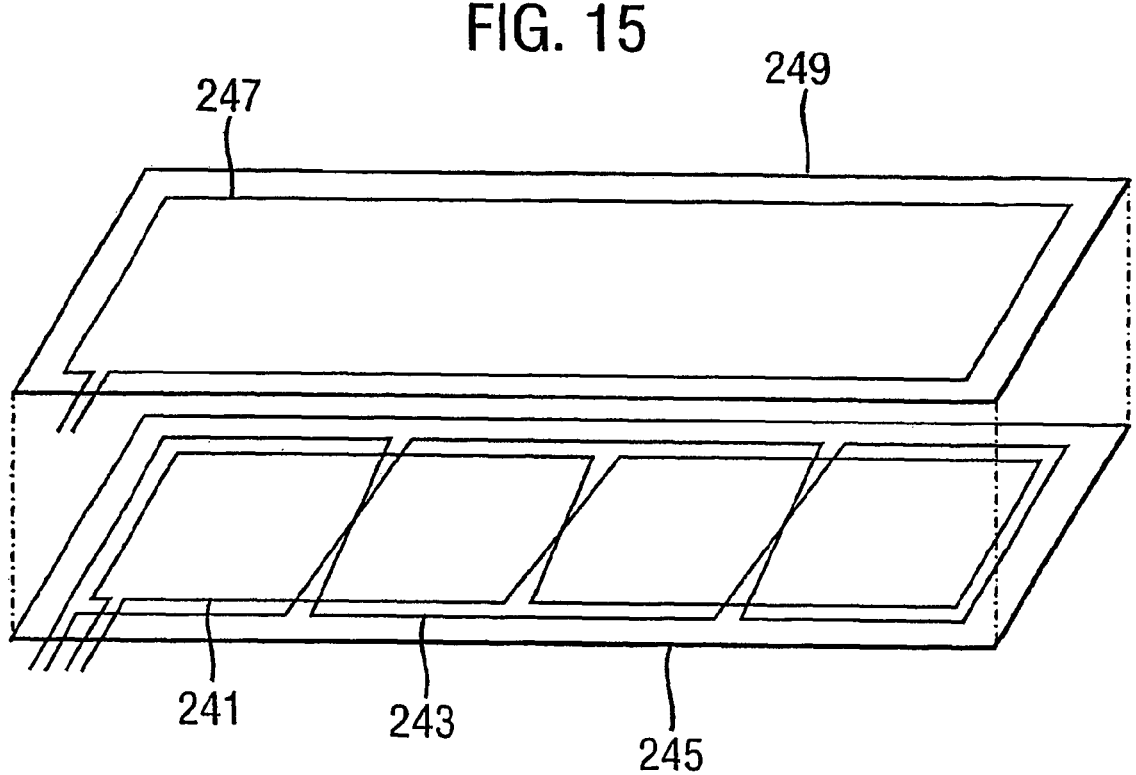
Figure 16:
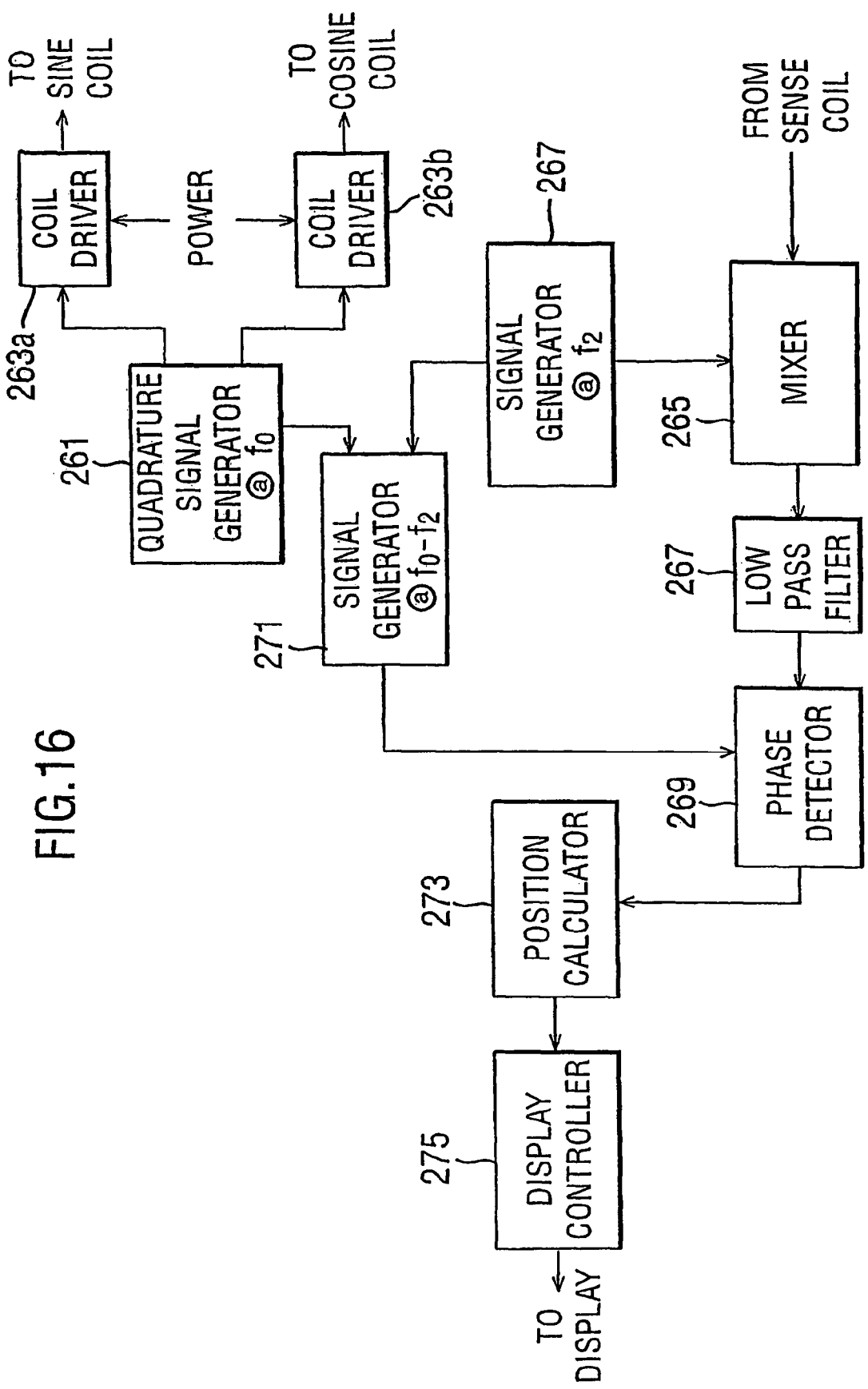
Figure 17:
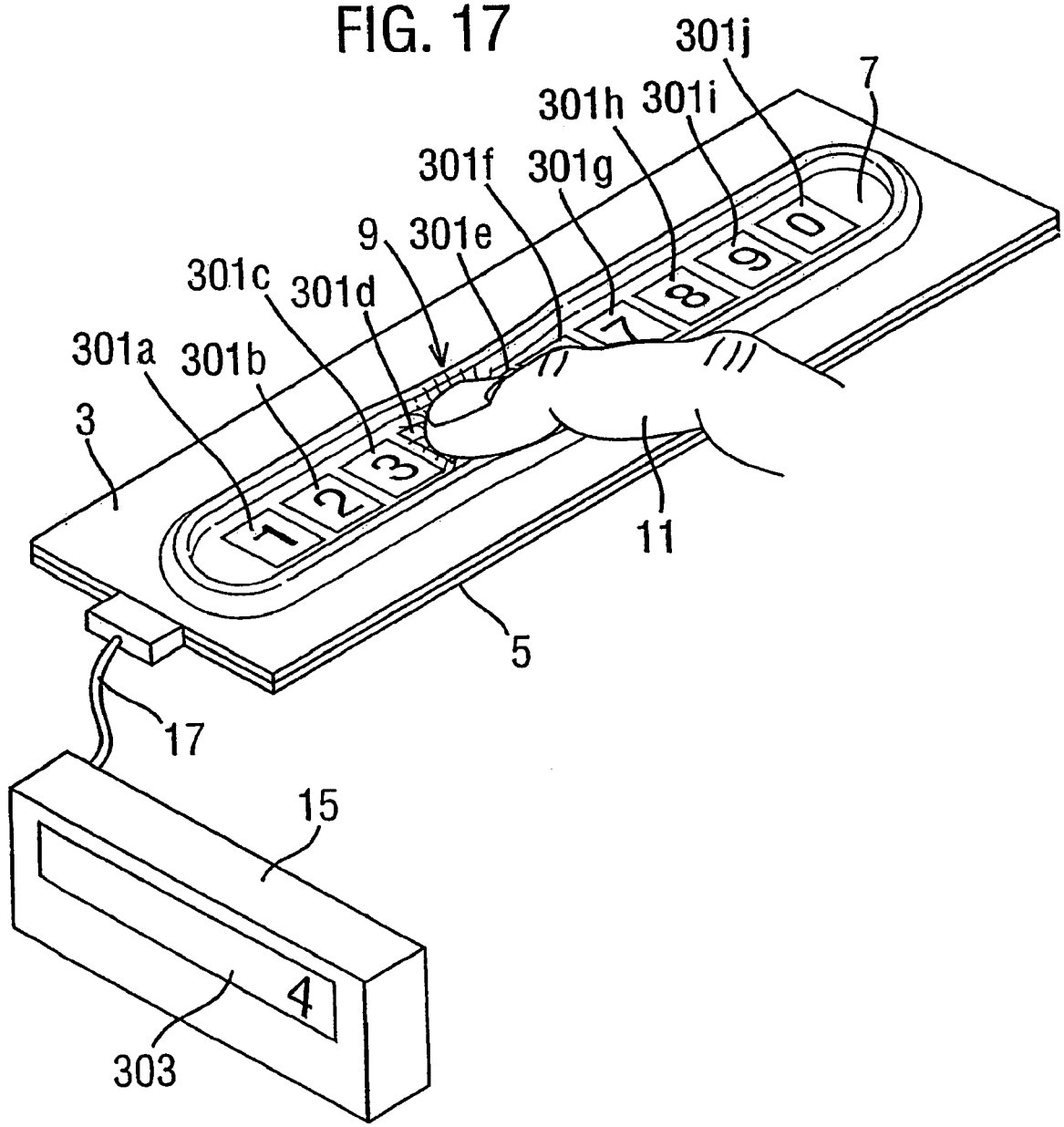

Various embodiments of the invention will now be described with reference to the attached Figures in which:

FIG. 1A schematically shows a perspective view of a sensor according to the invention;

FIG. 1B schematically shows a perspective view of the sensor illustrated in FIG. 1A with a portion cut away to reveal transmit and receive aerials;

FIG. 2 shows a cross-sectional view through the sensor illustrated in FIG. 1A;

FIG. 3 schematically shows a plan view of the transmit aerial, the receive aerial and a resonant circuit which form part of the sensor illustrated in FIG. 1A;

FIGS. 4A and 4B respectively show a sine coil and a cosine coil which form part of the transmit aerial illustrated in FIG. 3;

FIGS. 5A to 5C schematically show different stages during the formation of the transmit aerial and the receive aerial on a substrate;

FIGS. 6A and 6B schematically show the interaction between the main components of the sensor illustrated in FIG. 1A in an undeformed state and a deformed state respectively;

FIG. 7 shows in more detail the components of a signal generator and a signal processor illustrated in FIG. 6A and FIG. 6B;

FIG. 8 schematically shows a cross-sectional view through a first alternative sensor to the sensor illustrated in FIG. 1A;

FIG. 9 schematically shows a cross-sectional view through a second alternative sensor to the sensor illustrated in FIG. 1A;

FIG. 10 is a plan view of a transmit aerial and a receive aerial forming part of a third alternative sensor to the sensor illustrated in FIG. 1A;

FIG. 11 schematically shows a perspective view of a transmit aerial, a receive aerial and a resonant circuit which form part of a fourth alternative sensor to the sensor illustrated in FIG. 1A;

FIG. 12 schematically shows a plan view of a transmit aerial, a receive aerial and a resonant circuit which form part of a fifth alternative sensor to the sensor illustrated in FIG. 1A;

FIG. 13 schematically shows a plan view of an arrangement of transmit aerials, receive aerials and resonant circuits which from part of a sixth alternative sensor to the sensor illustrated in FIG. 1A;

FIG. 14 schematically shows a plan view of a transmit aerial, a receive aerial and a resonant circuit which form part of a seventh alternative sensor to the sensor illustrated in FIG. 1A;

FIG. 15 schematically shows a perspective view of a transmit aerial and a receive aerial which form part of an eighth alternative sensor to the sensor illustrated in FIG. 1A;

FIG. 16 schematically shows the main components of a signal generator and a signal processor forming part of a ninth alternative sensor to the sensor illustrated in FIG. 1A; and FIG. 17 schematically shows a perspective view of a tenth alternative sensor to the sensor illustrated in FIG. 1A.

FIRST EMBODIMENT

FIGS. 1A and 1B schematically show a sensor including a touch-sensitive pad 1 having a membrane 3 formed on a substrate 5, with the membrane 3 having an elongate portion 7 which is raised above the surface of the substrate 5 and which extends along a measurement path (the x-direction in FIGS. 1A and 1B). As shown in FIG. 1A, the sensor outputs a signal representative of the position of a localised region 9 along the measurement path where the raised portion 7 of the membrane 3 is pressed by a finger 11 towards the substrate 5 (i.e. is moved in the z-direction in FIGS. 1A and 1B). In particular, a value corresponding to the position of the localised region 9 along the measurement path is indicated on a display 13 which forms part of a control apparatus 15 that is connected to the touch-sensitive pad 1 via a cable 17.

As schematically shown in FIG. 1B, a resonant circuit 19 (represented in FIG. 1B by dashed lines) is formed on the underside of the raised portion 7 (i.e. on the side of the membrane 3 facing the substrate 5). Further, a portion of the membrane 3 has been cut away in FIG. 1B to reveal part of a transmit aerial 21 and part of a receive aerial 23 which are formed on the surface of the substrate 5. The transmit aerial 21 and the receive aerial 23 are respectively connected, via the cable 17, to a signal generator (not shown) and a signal processor (not shown) within the control apparatus 15. The signal generator supplies an oscillating electrical signal at the resonant frequency of the resonant circuit 19 to the transmit aerial 21, thereby causing the transmit aerial 21 to generate a magnetic field with a magnetic field strength component normal to the surface of the substrate 5 which oscillates at the resonant frequency of the resonant circuit 19. The signal processor processes signals corresponding to current induced in the receive aerial 23 as a result of the oscillating magnetic field strength component, and then sends a corresponding drive signal to the display 13 that causes the display 13 to show a value indicative of the position of the depressed region 9.

In this embodiment, the transmit aerial 21 and the receive aerial 23 are arranged so that the nett signal directly induced in the receive aerial 23 by the magnetic field generated by the transmit aerial 21 is substantially zero. Further, the transmit aerial 21 and the resonant circuit 19 are arranged so that when the raised portion 7 of the membrane 3 is not deformed, as shown in FIG. 1B, the nett signal induced in the resonant circuit 19 by the magnetic field generated by the transmit aerial 21 is substantially zero. In this way, a null signal is input to the signal processor from the receive aerial 23 when the membrane 3 is in an undeformed state, and accordingly the signal processor generates a drive signal causing the display 13 to show a null reading.

When the finger 11 of a user presses a local region 9 of the raised portion 7, as shown in FIG. 1A, the raised portion 7 deforms so that the part of the resonant circuit 19 at the depressed region 9 moves closer to the transmit aerial 21. This results in a current being induced in the resonant circuit 19 which is indicative of the location of the depressed region 9. This induced current in the resonant circuit 19 in turn induces a signal in the receive aerial 23 which is processed by the signal processor to determine a value representative of the location of the depressed region 9. The signal processor then generates a drive signal causing the display 13 to indicate the determined location value.

FIG. 2 schematically shows a cross-sectional view through the touch-sensitive pad 1. In this embodiment, the substrate 5 is a 3 mm thick Acrylonitrile-Butadiene-Styrene (ABS) thermoplastic panel. A 100 micron polyester sheet 31 is fixed to the substrate 5 by an adhesive layer 33. The membrane 3 is also formed by a 100 micron polyester sheet, and away from the raised portion 7 is fixed to the polyester sheet 31 by adhesive 35. In this embodiment, the membrane 3 has a ridge portion 37 surrounding the periphery of the raised portion 7. The ridge portion 37 allows the perpendicular distance between the raised portion 7 and the substrate 5 to be substantially constant over the extent of the raised portion 7 in the undeformed state.

FIG. 3 is a plan view illustrating the layout of the resonant circuit 19, the transmit aerial 21, and the receive aerial 23. As shown, in this embodiment the resonant circuit 19, the transmit aerial 21 and the receive aerial 23 are generally symmetric about a central longitudinal axis 39.

The resonant circuit 19 is formed by the series connection of a conductive track 41, which extends around a loop inside of the periphery of the raised portion 7 and has an associated inductance, and a capacitor 43. The inductance associated with the conductive track 41 and the capacitance of the capacitor 43 determine the resonant frequency $f_{res}$ of the resonant circuit. In this embodiment, the resonant frequency $f_{res}$ of the resonant circuit is 2 MHz.

The receive aerial 23 comprises a sense coil 45, formed by a conductive track which extends around the periphery of the substrate 5 with terminals 47a, 47b provided adjacent the central longitudinal axis 39 at one longitudinal end (hereafter called the cable end 48) for connection to signal processor via the cable 17.

The transmit aerial 21 comprises a sine coil 49, formed by a conductive track having terminals 51a and 51b adjacent the central longitudinal axis 39 at the cable end 48 for connection to the signal generator via the cable 17, and a cosine coil 53, formed by a conductive track having terminals 55a and 55b provided adjacent the central longitudinal axis 39 at the cable end 48 for connection to the signal generator via the cable 17. The sine coil 49 and the cosine coil 53 will now be described in more detail with reference to FIGS. 4A and 4B.

As shown in FIG. 4A, the conductive track forming the sine coil 49 extends along the measurement path from x=0, which corresponds to a position adjacent the longitudinal end of the raised portion 7 at the cable end 48, to x=L, which corresponds to a position adjacent the other longitudinal end of the raised portion 7. The transverse distance (i.e. the distance in the y-direction) between the conductive track 49 and the central longitudinal axis 39 varies along the measurement path from x=0 to x=L in accordance with one period of the sine function. At x=L, the conductive track reverses back on itself and returns to x=0 with the transverse distance to the central longitudinal axis 59 again varying along the measurement path in accordance with one period of the sine function. In this way, effectively a first current loop 61a and a second current loop 61b are formed. When a current signal I(t) is applied to the sine coil 49, current flows around the first current loop 61a and the second current loop 61b in opposite directions, and therefore the current flowing around the first current loop 61a generates a magnetic field which has an opposite polarity to the magnetic field generated by the current flowing around the second current loop 61b. This results in the sine coil 49 producing a first magnetic field having a magnetic field strength component $B_1$ resolved perpendicular to the substrate 5 which varies sinusoidally along the measurement direction x in accordance with the function:

$$B_1 = F(z)\sin\left(\frac{2\pi x}{L}\right)I(t) \qquad (1)$$

where F(z) is a function which varies in accordance with the normal distance z from the substrate 5.

As shown in FIG. 4B, the cosine coil 53 is formed by a conductive track having a first end part 63 which extends at x=0 from the terminal 55a to a first transverse side of the substrate 5, and then the conductive track extends along the measurement direction x from x=0 to x=L with the transverse distance from the central longitudinal axis 39 varying along the direction x in accordance with a period of the cosine function. At x=L, an end portion 65 of the conductive track crosses from the first transverse side of the substrate 5 to a second transverse side, and then the conductive track returns along the measurement direction to x=0 with the transverse distance from the central longitudinal axis 39 varying along the measurement path in accordance with a period of an inverted cosine function. At x=0, a third end portion 67 of the conductive track extends from the second transverse side to the terminal 55b. In this way, three loops 69a, 69b and 69c are formed of which the outer loops 69a and 69c are approximately half the size of the inner loop 69b. When a current signal I(t) is applied to the cosine coil 53, current flows in one direction around the outer loops 69a and 69c and in the opposite direction around the inner loop 69b. In this way, the magnetic field generated by the current flowing around the inner loop 69b has an opposite polarity to the magnetic field generated by the current flowing around the outer loops 69a and 69c. This results in a second magnetic field being generated having a magnetic field strength component $B_2$ resolved perpendicular to the substrate 5 which also varies sinusoidally along the measurement direction, but with a phase difference of π/2 radians (90°) from the phase of the first magnetic field component $B_1$, giving:

$$B_2 = F(z)\cos\left(\frac{2\pi x}{L}\right)I(t) \quad (2)$$

In this way, a total magnetic field component $B_T$ perpendicular to the substrate 5 is formed by the first magnetic field component $B_1$ and the second magnetic field component $B_2$, with the relative proportions of the first and second magnetic field components $B_1$ and $B_2$ varying along the measurement direction x.

The layout of the sine coil 49 is such that voltages induced in the sense coil 45 by current flowing around the first current loop 61a are substantially cancelled out by voltages induced in the sense coil 45 by current flowing around the second current loop 61b, and therefore no signal is directly induced in the sense coil 45 as a result of current flowing in the sine coil 49. Similarly, the layout of the cosine coil 53 is such that voltages induced in the sense coil 45 by the outer loops 69a, 69c are substantially cancelled out by voltages induced in the sense coil 45 by the inner loop 69b, and therefore no signal is directly induced in the sense coil 45 as a result of current flowing in the cosine coil 53. The transmit aerial 21 and the receive aerial 23 are therefore balanced with respect to each other. The layout of the sine coil 49 and the cosine coil 53 has the further advantage that the electromagnetic emissions from the sine coil 49 and the cosine coil 53 diminish with distance at a faster rate than for a single planar coil. This allows larger drive signals to be used while still satisfying regulatory requirements for electromagnetic emissions. This is particularly important because the regulatory requirements for electromagnetic emissions are progressively becoming stricter.

In this embodiment, the sine coil 49 and the cosine coil 53 forming the transmit aerial 21, and the sense coil 45 forming the receive aerial 23 are formed by printing conductive inks on the polyester sheet 31. In particular, initially, as shown in FIG. 5A, non-overlapping sections of conductive track 75a to 75e, corresponding to portions of the sine coil 49 and the cosine coil 53 having a negative slope (as shown in FIG. 5A) and the second end portion 65 of the cosine coil 53, are printed using a silver-loaded ink. Subsequently, as shown in FIG. 5B, a layer 77 of electrically non-conducting ink is formed over the substrate 5, with the non-conducting ink layer 77 including via holes 79a to 79j corresponding to the locations of the ends of the underlying conductive ink tracks. Finally, as shown in FIG. 5C, sections of conductive track 81a to 81e are printed on top of the non-conducting ink layer 77 corresponding to: the portions of the sine coil 49 and the cosine coil 53 having a positive slope (as shown in FIG. 5A); the first end portion 63 and the third end portion 67 of the cosine coil 53; and the conductive track forming the sense coil 45 of the receive aerial 23. The sections of conductive track printed on the non-conducting ink layer 77 are connected to the underlying sections of conductive track through the via holes 79, thereby forming the sine coil 49, the cosine coil 53 and the sense coil 45.

The resonant circuit 19 is formed by printing conductive ink on the membrane 3 in a similar manner to the formation of the sine coil 49 and the cosine coil 53. The capacitor 43 is formed by printing a first area of conductive ink, then printing non-conducting ink over the first area of conductive ink, and then printing a second area of conductive ink so that the non-conducting ink separates the first and second areas of conductive ink.

The operation of the sensor will now be described in more detail with references to FIGS. 6A and 6B. As shown, the signal generator 91 of the control apparatus 15 generates an in-phase signal I(t) and a quadrature signal Q(t) at respective different outputs. The in-phase I(t) is generated by amplitude modulating an oscillating carrier signal having a carrier frequency $f_0$ which is equal to the resonant frequency $f_{res}$ of the resonant circuit 19, which in this embodiment is 2 MHz, using a first modulation signal which oscillates at a modulation frequency $f_1$, which in this embodiment is 3.9 kHz. The in-phase signal I(t) therefore has a component of the form:

$$I(t)=A \sin 2\pi f_1 t \cos 2\pi f_0 t \quad (3)$$

Similarly, the quadrature signal Q(t) is generated by amplitude modulating the oscillating carrier signal having carrier frequency $f_0$ using a second modulation signal which oscillates at the modulation frequency $f_1$, with the second modulation signal being π/2 radians (90°) out of phase with the first modulation signal. The quadrature signal Q(t) therefore has a component of the form:

$$Q(t)=A \cos 2\pi f_1 t \cos 2\pi f_0 t \quad (4)$$

The in-phase signal I(t) is applied to the sine coil 49 and the quadrature Q(t) is applied to the cosine coil 53.

The signal processor 93 of the control apparatus 15 receives a sense signal S(t) from the sense coil 45, and processes the sense signal S(t) to determine if there is any deformation of the raised portion 7, and if so the location of that deformation. The signal processor 93 then sends an appropriate drive signal to the display 13.

FIG. 6A schematically shows the peak magnitude envelope of the magnetic field strength components $B_1$ and $B_2$ resolved perpendicular to the substrate 5 when the raised portion 7 is in its initial state (i.e. unpressed) in which the distance z between the raised portion 7 and the surface of the substrate 5 is substantially constant with a value $z_0$. The current $I_{res}$ induced in the resonant circuit 19 is proportional to the integral of the rate of change of the total magnetic field component $B_T$ along the measurement direction from x=0 to x=L. The current $I_{res}$ is therefore of the form:

$$I_{res} \propto F(z_0) \int_{x=0}^{x=L} \left\{ \frac{d}{dt}\left(\sin\left(\frac{2\pi x}{L}\right)\right)I(t) + \frac{d}{dt}\left(\cos\left(\frac{2\pi x}{L}\right)\right)Q(t) \right\} dx \quad (5)$$

As both the sine function and the cosine function integrate to zero over one period, when the raised portion 7 is in the initial state the current $I_{res}$ is substantially equal to zero.

As substantially no current is induced in the resonant circuit 19, similarly no current is induced by the resonant circuit in the sense coil 45. Therefore, when the raised portion 7 is in the initial state, the sense signal S(t) output by the sense coil 45 to the control apparatus 15 is a null signal. When the signal processor 93 detects the null signal, the signal processor 93 outputs a drive signal causing the display 13 to indicate a null reading.

FIG. 6B schematically shows the peak magnitude envelope of the magnetic field strength components $B_{1\ and\ B2}$ when the raised portion 7 is depressed towards the substrate 5 so that at the position $x=X_0$ the raised portion 7 is a distance $z_1$ from the substrate 5. As shown, the magnetic field components $B_1$ and $B_2$ follow a sine function and a cosine function respectively apart from the position $X_0$, where the amplitude of the magnetic field component strength is increased. Therefore, the current $I_{res}$ induced in the resonant circuit 19 substantially has the form:

$$I_{res} \propto F(z_0) \int_{x=0}^{x=L} \left\{ \frac{d}{dt}\left(\sin\left(\frac{2\pi x}{L}\right)I(t)\right) + \frac{d}{dt}\left(\cos\left(\frac{2\pi x}{L}\right)(Q(t))\right) \right\} dx + \\ (F(z_1) - F(z_0)) \cdot \left(\sin\left(\frac{2\pi X_0}{L}\right)\frac{dI(t)}{dt} + \cos\left(\frac{2\pi X_0}{L}\right)\frac{dQ(t)}{dt}\right) \quad (6)$$

As discussed with reference to Equation (5), the first term on the right hand side of Equation (6) is substantially zero. Therefore, in effect, the current $I_{res}$ is generated by the additional magnetic field component strengths at the portion $X_0$. Further, as the carrier frequency $f_0$ is significantly larger than this modulation frequency $f_1$, the expression for the current $I_{res}$ is approximated by:

$$I_{res} \propto (F(Z_1) - F(Z_0)) \cdot \sin(2\pi f_0 t) \cos\left(2\pi f_1 t - \frac{2\pi X_0}{L}\right) \quad (7)$$

As can be seen equation (7), the current $I_{res}$ induced in the resonant circuit 19 comprises an oscillating signal at the carrier frequency $f_0$ modulated by a modulation signal at the modulation frequency $f_1$, with the modulation signal having a phase which is dependent upon the position at which the raised portion 7 is depressed but which is independent of the amount by which the raised portion 7 is depressed. Therefore, the position at which the raised portion 7 is depressed can be calculated by measuring the phase of the component of the current $I_{res}$ at the modulation frequency $f_1$.

The current $I_{res}$ induced in the resonant circuit 19 generates a magnetic field which induces a sense signal S(t) in the sense coil 45. In other words, the resonant circuit 19 can be viewed as a magnetic field generator which generates a magnetic field representative of the location at which the raised portion 7 is depressed.

The sense signal S(t) induced in the sense coil 45 has the same form as the current $I_{res}$ induced in the resonant circuit 19, and therefore has a component at the modulation frequency $f_1$ whose phase is indicative of the position at which the raised portion 7 is depressed. The signal processor 93 measures this phase to determine a value for the position at which the raised portion 7 is depressed, and then sends a drive signal to the display 13 which causes the display 13 to indicate the determined position value.

In this embodiment, the control apparatus 15 is identical to the control unit of the position sensor described in UK patent application GB 2374424A, the whole content of which is incorporated herein by reference. The main components of the control apparatus 15 will now be described with reference to FIG. 7.

As shown, a quadrature signal generator 101 outputs a quadrature pair of signals at the modulation frequency $f_1$ to a modulator 103, which uses the quadrature pair of signals to modulate a carrier signal, at the carrier frequency $f_0$, generated by a signal generator 105. The resulting pair of modulated signals are respectively input to a pair of coil drivers 107a, 107b which amplify the modulated signals to produce the in-phase signal I(t) and the quadrature signal Q(t) that are input to the sine coil 49 and the cosine coil 53 respectively.

The sense signal S(t) from the sense coil 45 is input to a demodulator 107, which demodulates the sense signal S(t), using a signal at the carrier frequency $f_0$ from the signal generator 105, to form a demodulated signal at the modulation frequency $f_1$. The demodulated signal output by the demodulator 107 is input to a phase detector 109, which measures the phase of the demodulated signal, and outputs the phase measurement to a position calculator 111. A position value corresponding to the determined phase is calculated by the position calculator 111, and the calculated position value is output to a display controller 113, which generates a corresponding drive signal for the display 13.

SECOND EMBODIMENT

In the first embodiment, the resonant circuit 19 formed on the underside of the raised portion 7 is separated from the transmit and receive aerials formed on the surface of the substrate 5 by an air gap. A second embodiment will now be described, with reference to FIG. 8, in which a flexible foam material is positioned between the membrane 3 and the substrate 5. In FIG. 8, components which are identical to corresponding components in the first embodiment have been referenced by the same numerals and will not be described in detail again.

As shown in FIG. 8, in the second embodiment a layer of foam material 121 is positioned between the resonant circuit 19 printed on the membrane 3 and the transmit and receive aerials 21, 23 printed on the polyester sheet 31. In this embodiment, the foam material is a polyurethane foam. When a user depresses the raised portion 7 of the membrane 3 towards the substrate 5, the foam layer 121 at the depressed region is compressed and produces a biassing force opposing the compression. When the user stops depressing the membrane 3, this biassing force decompresses the foam layer 121, thereby moving the raised portion 7 of the membrane 3 back to its initial state.

In this embodiment, the control apparatus is identical to the control apparatus of the first embodiment and will not, therefore, be described in detail again.

THIRD EMBODIMENT

In the second embodiment, the foam material 121 provides a biassing force which moves the raised portion 7 back to an initial state in which the perpendicular distance between the membrane 3 and the substrate 5 is substantially constant over the extent of the raised portion 7. The ridge portion 37 is therefore to a large extent redundant.

FIG. 9 shows a cross-section through a touch-sensitive pad of a third embodiment in which the foam layer 121 is positioned between the entirety of the membrane 3 and the substrate 5. In particular, the foam layer 121 separates the resonant circuit 19 from the transmit and receive aerials 21, 23.

FOURTH EMBODIMENT

In the first embodiment, at the positions along the measurement direction where x=0 and x=L, the end portions 63, 65, 67 of the conductive track forming the cosine coil 53 effectively cross from one transverse side of the substrate 5 to the other. Current flowing along the end portions 63, 65, 67 of conductive track produces a magnetic field which distorts the sinusoidal variation of the second magnetic field component $B_2$ generated by the cosine coil 53. A fourth embodiment will now be described with reference to FIG. 10 in which the layout of the receive aerial is adjusted to compensate for this distortion to the magnetic field generated by the cosine coil 53. In the fourth embodiment, apart from the transmit aerial and the receive aerial, the remaining components of the sensor are identical to corresponding components in the first embodiment and will not therefore be described in detail again.

FIG. 10 shows a plan view of the transmit aerial and the receive aerial formed on the substrate 5 of the fourth embodiment. As shown, the transmit aerial is formed by a sine coil 131 and a cosine coil 133. In this embodiment, in order to increase the strength of the magnetic field generated by the transmit aerial, the conductive tracks forming the sine coil 131 and the cosine coil 133 follow twice around the path of the corresponding conductive tracks forming the sine coil 49 and cosine coil 53 of the first embodiment. In other words, each of the current loops formed by the sine coil 49 and the cosine coil 53 is effectively formed by a pair of overlapping coils.

In the fourth embodiment, as in the first embodiment, the transmit and receive aerials are formed by first printing conductive ink to form sections of the sine coil 131, the cosine coil 133 and the sense coil 135 (indicated in dashed lines in FIG. 10), then printing a layer of non-conducting ink with via holes corresponding to the ends of the already printed sections of conductive track, and then printing conductive ink to form the remaining sections of the sine coil 131, the cosine coil 133 and the sense coil 135 (indicated in full lines in FIG. 10).

The receive aerial is formed by a sense coil 135 having a major loop which surrounds the sine coil 131 and the cosine coil 133. At the longitudinal ends of the major loop, the sense coil 135 has subsidiary loops 137a, 137b. The sense coil 135 is arranged so that current flowing through the sense coil 135 loops around the subsidiary loops in the same direction to the direction in which current flows around the major loops. Further, the subsidiary loops 137 are shaped so that when current flows through the cosine coil 133, the signal induced in the major loop as a result of current flowing through the end portions of the cosine coil 133 is balanced by corresponding signals induced in the subsidiary loops 137 as a result of current flowing through the end portions of the cosine coil 133. In this way, when the raised portion of the membrane is in the initial state (i.e. is not depressed), a null signal is induced in the sense coil 135.

FIFTH EMBODIMENT

In the preceding embodiments, the receive aerial 155 is formed by a sense coil which surrounds the sine coil and the cosine coil of the transmit aerial, and the resonant circuit extends along the length of a measurement path defined by the transmit aerial. A fifth embodiment will now be described with reference to FIG. 11 in which the receive aerial is formed by a sense coil which is adjacent to the transmit aerial, and the resonant circuit extends over both the transmit aerial and the receive aerial. In the fifth embodiment, the control apparatus is identical to the control apparatus of the first embodiment and will not therefore be described in detail again.

As shown in FIG. 11, in this embodiment, the substrate 151 has a rectangular surface defined by first and second longitudinal edges 153a, 153b and first and second transverse edges 155a, 155b. The receive aerial is formed by a sense coil 157 positioned adjacent the first longitudinal edge 153a. The sense coil 157 is formed by a conductive track which generally follows a "figure of eight" pattern to form, in effect, first and second conductive loops 159a, 159b, with the first conductive loop 159a adjacent the first transverse edge 155a and the second conductive loop 159b adjacent the second transverse edge 155b. The sense coil 157 extends across substantially the full width of the substrate, but only along approximately one-fifth of the length of the substrate 151 from the first longitudinal edge 153a.

The transmit aerial is formed by a sine coil 161 and a cosine coil 163. As shown, the transmit aerial extends along approximately four-fifths of the length of the substrate 151 from the edge of the receive aerial up to the second longitudinal edge 153b, so that the receive aerial and the transmit aerial are formed side-by-side and do not overlap. The layout of the sine coil 161 and the cosine coil 163 is the same as the layout of the sine coil and the cosine coil of the first embodiment, except that the conductive tracks forming the sine coil 161 and the cosine coil 163 vary along the length of the substrate 151 in accordance with square wave functions which are 90° out of phase with each other, rather than sine and cosine functions. Nevertheless, the magnetic field component strengths associated with the sine coil 161 and the cosine coil 163 are given by the expressions in equations (1) and (2).

A membrane 165 is supported (by a support which is not shown) relative to the substrate 151. A resonant circuit 167 is formed on the membrane 165 by a conductive track connected in parallel with a capacitor 169. The conductive track comprises a major loop 171, which substantially overlays the transmit aerial, and two subsidiary loops 173a, 173b which substantially overlay the two conductive loops 159a, 159b of the sense coil 157 respectively. In particular, the conductive track of the resonant circuit 167 is arranged so that current flowing in the resonant circuit 167 flows around the subsidiary loops 173 in opposite directions.

As shown, the transmit aerial and the receive aerial are substantially symmetrical about a central longitudinal axis of the substrate 151, but current flows around the conductive loops 159 in opposite directions. This has the result that equal and opposite signal components are induced in the conductive loops 159 of the sense coil by magnetic fields generated by the sine coil 161 and the cosine coil 163. Further, in an initial state (i.e. when the membrane 165 is not pressed towards the substrate 151), the signal components induced in the major loop 171 of the resonant circuit 167 by the sine coil 161 and the cosine coil 163 integrate to zero, and therefore in the initial state the resonant circuit 167 induces substantially no signal in the sense coil 157. However, as in the first embodiment, when a portion of the membrane 165 overlaying the transmit aerial is pressed by a user towards the transmit aerial, a signal is induced in the major loop 171 of the resonant circuit 167 having a phase representative of the location of the depression of the membrane 165. This induced signal then flows around the subsidiary loops 173a, 173b of the resonant circuit 167 in opposite directions, and the resulting signals induced in the sense coil 157 add to each other to form a sense signal S(t).

By spatially separating the receive aerial from the transmit aerial, it is generally easier to balance the sense coil 157 of the receive aerial with respect to both the sine coil 161 and the cosine coil 163 of the transmit aerial by introducing complementary current loops in the sense coil 157. Further, by adjusting the layout of the resonator circuit to match the layout of the complementary current loops of the sense coil 157, the coupling between the resonator circuit 167 and the sense coil 157 of the receive aerial can be increased, thereby increasing the magnitude of the sense signal S(t).

SIXTH EMBODIMENT

In the preceding embodiments, the length L of the measurement path is equal to the period of the sine coil and the cosine coil, and therefore the phase of the sense signal S(t) varies through $2\pi$ radians (360°) over the length L of the measurement path. Consequently, the signal processor within the control apparatus is able to identify unambiguously the location where the membrane is pressed towards the substrate. If the length of the measurement path is increased by correspondingly increasing the period of the sine coil and the cosine coil, then the accuracy of the position measurement is reduced. Alternatively, if the length of the measurement path is increased by using plural periods of the sine coil and the cosine coil, then the control apparatus is no longer able to determine unambiguously the location where the membrane is pressed towards the substrate.

A sixth embodiment of the invention will now be described with reference to FIG. 12 in which a multiple pitch coil arrangement is used to enable accurate position measurement over a long measurement length.

FIG. 12 shows a plan view of the transmit aerial, receive aerial, and resonant circuit of this embodiment. As shown, the transmit aerial comprises a first sine coil 181 and a first cosine coil 183 which each have a period equal to the length of the measurement path, and a second sine coil 185 (shown in dotted lines in FIG. 12) and a second cosine coil 187 (shown in dashed lines in FIG. 12) each having a period equal to one third of the length of the measurement path. The receive aerial is formed by a sense coil 189 which extends around the transmit aerial, and the resonant circuit is formed by a loop of conductive track 191 extending along the measurement path with each end of the loop connected to a respective terminal of a capacitor 193.

In this embodiment, the control apparatus (not shown in FIG. 12) outputs a pair of excitation signals at the carrier frequency $f_0$ (which is equal to the resonant frequency of the resonant circuit) which are respectively modulated by first and second modulation signals at a modulation frequency $f_1$ which are 90° out of phase with each other. The resulting pair of modulated signals are applied to the first sine coil 181 and first cosine coil 183 respectively so that, in the manner described in the first embodiment, a sense signal $S_1(t)$ is induced in the sense coil 189 having a component at the modulation frequency $f_1$ whose phase unambiguously identifies the coarse location of the depression of the membrane towards the substrate. The pair of modulated signals are then applied to the second sine coil 185 and the second cosine coil 187 respectively to induce a sense signal $S_2(t)$ in the sense coil 189 having a component at the modulation frequency $f_1$ whose phase represents a fine position measurement of the depression of the membrane towards the substrate which is ambiguous in that it could correspond to a number of different points along the measurement path. However, the signal processor within the control apparatus is able to determine which of the possible points indicated by the fine position measurement is the correct point because only one of the possible position measurements conforms with the unambiguous coarse position measurement provided by the first sine coil 181 and the first cosine coil 183.

SEVENTH EMBODIMENT

In the previous embodiments, the position along a rectilinear measurement path at which a membrane is pressed towards a substrate is measured. A seventh embodiment will now be described with reference to FIG. 13 in which the position at which a membrane is pressed towards a substrate is measured in two dimensions.

As shown in FIG. 13, in this embodiment the touch-sensitive pad has four linear sensors, each having a rectilinear measurement path which is parallel to the x-direction, placed side-by-side in the y-direction. In particular, the substrate 201 of the touch-sensitive pad has four receive aerials, formed by four sense coils 203a to 203d, and four transmit aerials, formed by four sine coils 205a to 205d and four cosine coils 207a to 207d. The sense coil 203 of each receive aerial surrounds a sine coil 205 and cosine coil 207 of a respective transmit aerial. The membrane (not shown) of the touch-sensitive pad has conductive tracks formed thereon constituting four resonant circuits 209a to 209d, with each resonant circuit 209 associated with a respective transmit aerial and receive aerial pair.

In use, the control apparatus (not shown) sequentially interrogates each linear sensor. When a user depresses the membrane, the control apparatus determines a measure of the position of the depression in the y-direction from which of the linear sensors produces a sense signal S(t) which is other than a null signal, and from that sense signal S(t) the control apparatus determines the position of the depression in the x-direction.

EIGHTH EMBODIMENT

In the seventh embodiment, the position of the depression of a membrane is detected in two dimensions by providing a plurality of linear sensors arranged side by side. Alternatively, the position of depression can be determined in two dimensions by using a single sensor which defines a single, non-rectilinear measurement path extending over a two-dimensional area.

An eighth embodiment will now be described with reference to FIG. 14 in which a single sensor defines a boustrophedon-type measurement path. In other words, the measurement path zig-zags from one edge of a two-dimensional area to another.

As shown in FIG. 14, in this embodiment the transmit aerial is formed by a sine coil 221 (shown by a chained line) and a cosine coil 223 (shown by a dashed line in FIG. 14). Both the sine coil 221 and the cosine coil 223 are separated into four quarter-period portions which are aligned with the x-direction, but are offset from each other in the y-direction so that the quarter-period portions are formed side-by-side. In particular, the first quarter-period portions of the sine coil 221 and the cosine coil 223, which extend along the positive x-direction, are connected to second quarter-periods of the sine coil 221 and the cosine coil 223, which extend along the negative x-direction, by portions of conductive track aligned with the y-direction. Similarly, the second quarter-periods are connected to the third quarter-periods, which extend along the positive x-direction, which are in turn connected to the fourth quarter periods, which extend along the negative x-direction.

The receive aerial is formed by a sense coil 225 which surrounds the entirety of the sine coil 221 and the cosine coil 223. A resonant circuit 227 includes a conductive track forming a loop which generally follows the zig-zag path of the sine coil 221 and the cosine coil 223.

The only difference between the control apparatus of this embodiment and the control apparatus of the first embodiment is that in this embodiment, the position calculator includes a look-up table associating phases of the sense signal S(t) with respective two-dimensional positions. When the control apparatus applies an in-phase signal I(t) to the sine coil 221 and a quadrature signal Q(t) to the cosine coil 223, if the membrane on which the resonant circuit 227 is formed is not depressed then the sense signal S(t) in the sensor coil 225 is a null signal. If, however, the membrane is depressed, then a sense signal S(t) is formed in the sense coil 225 having a component at the modulation frequency $f_1$ whose phase is representative of the location of the depression of the membrane along the measurement path defined by the transmit aerial. The control unit converts this phase measurement into a two-dimensional position measurement using the stored look-up table.

MODIFICATIONS AND FURTHER EMBODIMENTS

In the eighth embodiment, the transmit aerial defines a zig-zag shaped measurement path. Alternatively, other forms of measurement path extending over two dimensions could be used. For example, the transmit aerial could form a spiral-shaped measurement path.

In the seventh embodiment, a plurality of linear sensors are aligned in the x-direction but offset from each other in the y-direction. The position in the y-direction is determined by identifying in which of the linear sensors a signal is induced indicative of depression of the membrane. Alternatively, in addition to the linear sensor aligned in the x-direction, a plurality of linear sensors could also be provided whose measurement paths are aligned in the y-direction but are offset from each other in the x-direction. In this way, the linear sensors in the y-direction can provide a more accurate determination of the co-ordinate in the y-direction of the location of the depression of the membrane.

In the seventh embodiment, the linear sensors are sequentially interrogated by the control apparatus. Alternatively, the control apparatus could continuously interrogate all of the linear sensors, with the modulation frequency of the in-phase signal I(t) and the quadrature signal Q(t) being different for each of the linear sensors so that the components of the sense signal S(t) induced by each linear sensor can be isolated using a filter arrangement.

In the above-described embodiments, a passive resonant circuit (or resonator) forms an intermediate coupling element between a transmit aerial and a receive aerial. However, in some circumstances it may be advantageous to use a powered resonator so that the signal induced in the resonator is considerably amplified, thereby reducing the sensitivity requirements of the signal processing circuitry.

Instead of using a resonant circuit, the intermediate coupling element could alternatively be formed by a conductive loop or a conductive disc. However, the use of a resonant circuit is preferred because the resonant properties of the resonant circuit provide for a larger sense signal S(t).

An intermediate coupling element is not essential, and alternatively one of the transmit aerial and the receive aerial could be formed on the substrate while the other is formed on the membrane. FIG. 15 schematically shows an embodiment in which a transmit aerial, comprising a sine coil 241 and a cosine coil 243, is formed on a substrate of a touch-sensitive pad and a receive aerial, comprising a sense coil 247, is formed on a resiliently deformable membrane 249 of the touch-sensitive pad. The membrane is supported relative to the substrate by a support (not shown in FIG. 15) so that when the membrane 249 is in an initial, undeformed state, the sense signal S(t) in the sense coil 247 is a null signal. However, when a localised region of the membrane 249 is depressed towards the substrate 245, then a sense signal S(t) is induced in the sense coil 247 which is indicative of the location of the depressed region.

In the first embodiment, the conductive tracks forming the transmit aerial and the receive aerial are formed by printing conductive ink on the substrate, and the resonant circuit is formed by printing conductive ink on the membrane. It will be appreciated that other manufacturing techniques could be used to form the transmit aerial, the receive aerial, and the resonant circuit. For example, the transmit aerial and the receive aerial could be formed by depositing conductive tracks on a printed circuit board in a conventional manner.

The formation of aerials and/or intermediate coupling elements by printing conductive inks is widely applicable. For example, the transmit and receive aerials of the positions sensor described in GB 2374424A could be formed in this way. The conductive inks could be printed on a number of materials, for example relatively standard polymers such as polyester and polyamide.

As described in the first embodiment, a capacitor can be formed by printing a first area of conductive ink, then a layer of dielectric ink over the first area of the conductive ink, and then printing a second area of conductive ink over the first layer of conductive ink so that the layer of dielectric ink separates the first and second areas of conductive ink. Different capacitive values can be achieved by varying the sizes of the areas of conductive ink or by varying the thickness of the layer of dielectric ink.

In the first to eighth embodiments, a transmit aerial and a receive aerial are formed on the substrate of the touch-sensitive pad, and an intermediate coupling element is formed on the membrane. It will be appreciated that alternatively, the intermediate coupling element could be formed on the substrate and the transmit and receive aerials could be formed on the membrane.

In the described embodiments, the position of a localised deformation of a membrane relative to a substrate is detected. In general, however, for any two members which are supported relative to each other in a manner that allows localised relative movement between the two members, the position of a local deformation can be detected. In an embodiment, the transmit aerial, the receive aerial and the resonant circuit are formed using copper wire, with the resonant circuit attached directly on one side of a foam layer and the transmit aerial and the receive aerial attached on the other side of the foam layer. In this case, the resonant circuit forms one member and the transmit aerial and the receive aerial form the other member.

In the described embodiments, the transmit aerial is formed by a sine coil and a cosine coil which are arranged so that their relative contributions to the total magnetic field component perpendicular to the substrate varying in accordance with position along the measurement direction. In particular, the sine and cosine coils have an alternate twisted loop structure. However, it will be appreciated that an enormous variety of different excitation winding geometries could be employed to form a transmit aerial which achieves the objective of causing the relative proportion of the total magnetic field component perpendicular to the substrate contributed by different excitation windings to vary along a measurement path.

In the described embodiments, a transmit aerial is formed by two excitation windings and a receive aerial is formed by a single sensor winding. It will be appreciated that many other arrangements of transmit aerial and receive aerial in which the electromagnetic coupling between the transmit aerial and the receive aerial varies along a measurement path could be used. For example, the transmit aerial could be formed by a single excitation winding and the receive aerial could be formed by a pair of sensor windings, with the electromagnetic coupling between the intermediate coupling element and the receive aerial varying in response to deformation, i.e. the respective strengths of signals induced in the two sensor windings being indicative of the location of the deformation.

In the second and third embodiments, a polyurethane foam separates the substrate from the membrane. It will be appreciated that other forms of foamed rubber could be used. In an alternative embodiment, the deformable material separating the membrane and the substrate is neoprene.

It will be appreciated that the sensing apparatus described in the first embodiment could be adapted to measure a linear position along a curved line, for example a circle (i.e. a rotary positioning sensor), by varying the layout of the sine coil and the cosine coil in a manner which would be apparent to persons skilled in the art. The inductive sensor could also be used as a speed detector detecting the speed of a body which moves along the measurement path while locally depressing the membrane towards the substrate.

In the previously described embodiments, a localised position at which a membrane is pressed towards the surface of a substrate is measured. Other forms of localised deformation are also possible. For example, in an alternative embodiment the first and second members are both bendable, and the position of a localised bending is determined due to the variation in electromagnetic coupling at that position.

In the described embodiments, a carrier frequency of 2 MHz is used. Using a high frequency carrier frequency has the advantage of improving the inductive coupling between the transmit aerial and the receive aerial. Typical values for the carrier frequency would be in the range 100 kHz to 10 MHz.

In the previously described embodiments, the signal generator within the control apparatus generates an in-phase signal I(t) and a quadrature signal Q(t) comprising a carrier signal at a carrier frequency modulated by respective modulation signals at a modulation frequency which is significantly less than the carrier frequency. The signal processor within the control apparatus measures the phase of a component of a sense signal S(t) at the modulation frequency in order to determine a measure of the position where the membrane is depressed. This arrangement advantageously combines the increase in the magnitude of the coupling between the transmit aerial and the receive aerial resulting from the use of a comparatively high carrier frequency with the straightforward signal processing techniques used to measure the phase of a signal at the lower modulation frequency. Further, the filtering effect of the coil drivers and the resonant coupling between the transmit aerial and the resonant circuit enable the use of comparatively low quality digitally-generated excitation signals.

An alternative control apparatus which could be used in the described embodiments is the control unit of the position sensor described in UK patent application No. 0224100.8, the whole content of which is hereby incorporated by reference. FIG. 16 shows the main components of such a control apparatus. A quadrature signal generator 261 generates a quadrature pair of excitation signals at a first frequency $f_0$, which in this embodiment 2 MHz. The quadrature pair of signals are respectively applied to first and second coil drivers 263a, 263b where they are amplified prior to being applied to the sine coil and the cosine coil. These signals induce a sense signal S(t) at the first frequency $f_0$ in the sense coil whose phase is indicative of the position of the depression of the membrane towards the substrate. However, as the first frequency $f_0$ is comparatively high, it is difficult to measure accurately the phase of the sense signal S(t). In order to overcome this problem, a heterodyne detection system is employed in which the sense signal is input to a mixer 265 where it is mixed with a signal at a second frequency $f_2$ generated by a signal generator 267. The second frequency $f_2$ is close to, but not identical with, the first frequency $f_0$. The mixer therefore outputs a signal having a low frequency component at frequencies $f_0-f_2$ and a high frequency component at frequency $f_0+f_2$. The high frequency component is removed by a low pass filter 268, and the remaining low frequency component at frequency $f_0-f_2$ is input to a phase detector 269, which detects the phase of the low frequency component with respect to a reference signal at frequency $f_0-f_2$ provided by a signal generator 271. This phase is indicative of the position at which the membrane is pressed towards the substrate. The detected phase is input to a position calculator, which converts the detected phase into a position value, and the position value is output to a display controller which generates a corresponding drive signal to cause the display to indicate the calculated position value.

It will be appreciated that the control apparatus described with respect to FIG. 16 also combines the advantages of using a high frequency for the inductive coupling between the transmit aerial and the receive aerial, and a low frequency for the signal processing to determine the position value.

In the described embodiments, a value indicative of the detected position is displayed on a display. However, in many applications the value is used as a control parameter for an associated system. For example, the sensing apparatus could be incorporated within an automobile, a domestic appliance such as a washing machine, electrical equipment, aerospace equipment, agricultural equipment, industrial machinery, ships, textile machinery, sports equipment, audio/visual equipment, defence equipment, IT/communications equipment, personal computers or security systems.

The dimensions of the sensors can vary over many orders of magnitude. Typically, the measurement path extends for a distance of from a few millimetres to several metres. A larger scale application would be to monitor local pressure points applied to a mattress by a person lying on the mattress. Such a system would be advantageous for monitoring the manner in which bedridden people would lie in bed as a preventative measure against pressure sores, or to monitor the motion of a baby lying in a cot as a security system.

In addition to printing the resonant circuit on the membrane, user information can also be printed on the membrane. FIG. 17 shows an alternative embodiment which differs from the first embodiment in that: (i) a decimal keypad 301a-301j is formed on the upper surface of the membrane (i.e. the surface facing away from the substrate), with each number of the decimal keypad being in a different region of the raised portion of the membrane; (ii) the control apparatus includes a look-up table associating each region of the membrane with the corresponding numeral; and (iii) the control apparatus includes a numeric display 303 and associated display controller (not shown). When the finger of a user presses one of the numerals indicated on the raised portion of the membrane, the control apparatus calculates the location of the depression and, using the look-up table, determines the corresponding numeral. The determined numeral is then displayed on the numeric display 303.

In a preferred embodiment, the membrane is detachably mountable to the substrate. This allows identical substrates to be used for many different man-machine interfaces, with only the user information printed on the respective membranes and the signal processing circuitry varying between the man-machine interfaces. In this way, the development and customization of products incorporating sensing apparatuses according to the present invention is significantly simplified.

As described previously, in the first embodiment the control apparatus is identical to the control apparatus of the position sensor described in GB 2374424A. In an embodiment, a sensing system comprises a common control unit for one or more position sensors as described in the first embodiment and one or more position sensors as described in GB 2374424A, with a multiplexer being positioned between the control unit and the transmit aerials and receive aerials of the sensors so that the control unit is able to selectively address individual sensors. Typical situations in which such a plurality of sensing apparatuses are required are in an automobile or in a domestic appliance such as a washing machine, a tumble dryer, a dishwasher and the like.

Another application for the sensing apparatus of the present invention is to measure the position of an impact. For example, the sensing apparatus could measure the position of the impact of a projectile on a target. The projectile could be, for example, a ball.

In another embodiment, the touch-sensitive pad is made with transparent materials and is placed in front of a display screen. A user is then able to input information by pressing positions on the touch-sensitive pad which correspond to information displayed at corresponding positions on the display screen. Preferably, the conductive tracks are formed using wire have as small a gauge as possible, or a transparent conductor such as Indium Tin Oxide. In an alternative embodiment, a transmit aerial and a receive aerial are formed on one side of a display screen and an intermediate coupling element formed on the other side of the display screen to reduce any loss of picture quality.

The invention claimed is:

1. A sensing apparatus comprising:
   first and second members supported relative to each other by a support;
   the first member comprising a magnetic field generator for generating a magnetic field; and
   the second member comprising an aerial for monitoring the magnetic field generated by the magnetic field generator,
   wherein at least one of the first and second members is locally deformable relative to the other of the first and second members by pressure applied to a localised region thereof in order to vary the electromagnetic coupling between the magnetic field generator and the aerial at the localised region so that a signal is induced in the aerial indicative of the position of the local deformation.

2. The sensing apparatus according to claim 1, wherein said aerial is a receive aerial, and wherein said magnetic field generator is a transmit aerial.

3. The sensing apparatus according to claim 1, wherein said aerial is a receive aerial, wherein the second member further comprises a transmit aerial defining a measurement path, and wherein the magnetic field generator is an intermediate coupler for electromagnetically coupling the transmit aerial and the receive aerial along the measurement path.

4. A sensing apparatus comprising:
   first and second members supported relative to each other by a support, the first member comprising a transmit aerial and a receive aerial and the second member comprising an intermediate coupler which is operable, in response to an excitation signal being applied to the transmit aerial, to generate a magnetic field in order to induce a sense signal in the receive aerial,
   wherein at least one of the first and second members is locally deformable relative to the other of the first and second members by pressure applied to a localised region thereof in order to vary the electromagnetic coupling between at least one of i) the transmit aerial and the intermediate coupler, and ii) the intermediate coupler and the receive aerial at the localised region so that a signal is induced in the receive aerial indicative of the position of the local deformation.

5. The sensing apparatus according to claim 4, wherein the transmit aerial comprises first and second excitation windings and the receive aerial comprises a sensor winding,
   wherein the first and second excitation windings are electromagnetically coupled to the sensor winding via the intermediate coupler such that the electromagnetic coupling between the first and second excitation windings and the sensor winding varies in accordance with respective different functions along said measurement path.

6. The sensing apparatus according to claim 5, wherein the first and second excitation windings and the sensor winding are arranged so that said first and second functions vary sinusoidally with position with the same period but are out of phase with each other.

7. The sensing apparatus according to claim 6, wherein the first and second functions are one quarter of a cycle out of phase with each other.

8. The sensing apparatus according to claim 4, wherein the intermediate coupler comprises a resonant circuit.

9. The sensing apparatus according to claim 8, wherein the resonant circuit comprises at least one current loop which extends along the measurement path defined by the transmit aerial.

10. The sensing apparatus according to claim 4, wherein the transmit aerial and the receive aerial are positioned side by side, and wherein the intermediate coupler extends adjacent to the transmit aerial and the receive aerial.

11. The sensing apparatus according to claim 10, wherein the receive aerial comprises a sensor winding defining a first set of two or more loops, and wherein the intermediate coupler comprises a conductive winding having a portion adjacent the receive aerial defining a second set of two or more loops matching said first set of two or more loops.

12. The apparatus according to claim 4, wherein at least one of the transmit aerial and the receive aerial comprises a track of conductive ink.

13. The sensing apparatus according to claim 4, further comprising a signal generator operable to apply an excitation signal to the transmit aerial, and a signal processor operable to process said induced signal in the receive aerial to determine the position of the local deformation.

14. The sensing apparatus according to claim 13, wherein the signal generator is operable to generate an excitation signal comprising a periodic carrier signal having a first frequency modulated by a periodic modulation signal having a second frequency, the first frequency being greater than the second frequency.

15. The sensing apparatus according to claim 14, wherein the signal processor comprises a demodulator operable to demodulate the induced signal generated in the receive aerial to obtain a demodulated signal at the second frequency.

16. The sensing apparatus according to claim 15, wherein the signal processor further comprises a phase detector operable to detect the phase of the demodulated signal at the second frequency.

17. The sensing apparatus according to claim 13, wherein the signal generator is operable to apply an excitation signal at a first frequency to the transmit aerial in order to induce a signal at the first frequency in the receive aerial, and the signal processor comprises a mixer operable to mix said induced signal at the first frequency with a reference signal at a second frequency, which is different from the first frequency, to generate a beat signal.

18. The sensing apparatus according to claim 17, wherein the signal processor comprises a phase detector for detecting the phase of the beat signal.

19. The sensing apparatus according to claim 4, wherein the transmit aerial defines a rectilinear measurement path.

20. The sensing apparatus according to claim 4, wherein the transmit aerial defines a measurement path which zigzags across a measurement path.

21. The sensing apparatus according to claim 4, wherein the support is arranged to support the first member relative to the second member in an undeformed state in which the magnetic field generator is operable to produce a magnetic field which induces a null signal in the aerial.

22. The sensing apparatus according to claim 4, wherein the support supports the first member relative to the second member so that, in the absence of deformation, an air gap separates the magnetic field generator and the aerial.

23. The sensing apparatus according to claim 4, wherein the support comprises a deformable material separating the magnetic field generator and the aerial.

24. The sensing apparatus according to claim 4, wherein one of the first and second members comprises a substrate and the other of the first and second members comprises a membrane,
wherein the support supports at least part of the membrane away from the surface of the substrate in the absence of deformation.

25. The sensing apparatus according to claim 24, wherein the membrane comprises a ridge defining a portion of the membrane which, in the absence of deformation, is substantially within a plane parallel with the surface of the substrate.

26. The sensing apparatus according to claim 24, wherein the membrane is separated from the substrate by a layer of flexible material so that the membrane is deformable in a direction toward the surface of the substrate.

27. The sensing apparatus according to claim 26, wherein the flexible material is resiliently deformable.

28. The sensing apparatus according to claim 4, wherein at least one of the first and second members comprises index markings associating different positions with respective information.

29. A man-machine interface comprising a sensing apparatus having:
first and second members supported relative to each other by a support, the first member comprising a transmit aerial and a receive aerial and the second member comprising an intermediate coupler which is operable, in response to an excitation signal being applied to the transmit aerial, to generate a magnetic field in order to induce a sense signal in the receive aerial,
wherein at least one of the first and second members is locally deformable relative to the other of the first and second members by pressure applied to a localised region thereof in order to vary the electromagnetic coupling between at least one of i) the transmit aerial and the intermediate coupler, and ii) the intermediate coupler and the receive aerial at the localised region so that a signal is induced in the receive aerial indicative of the position of the local deformation.

* * * * *